US012771516B2

(12) United States Patent
Huang et al.

(10) Patent No.: US 12,771,516 B2
(45) Date of Patent: Oct. 20, 2026

(54) COMMUNICATION METHOD AND APPARATUS

(71) Applicant: HUAWEI TECHNOLOGIES CO., LTD., Shenzhen (CN)

(72) Inventors: Huang Huang, Shenzhen (CN); Qianli Ma, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 373 days.

(21) Appl. No.: 18/541,050

(22) Filed: Dec. 15, 2023

(65) Prior Publication Data

US 2024/0121068 A1 Apr. 11, 2024

Related U.S. Application Data

(63) Continuation of application No. PCT/CN2022/096686, filed on Jun. 1, 2022.

(30) Foreign Application Priority Data

Jun. 17, 2021 (CN) ......................... 202110670099.6

(51) Int. Cl.
*H04L 5/00* (2006.01)
*H04L 27/36* (2006.01)

(52) U.S. Cl.
CPC .......... *H04L 5/0094* (2013.01); *H04L 5/0044* (2013.01); *H04L 5/0051* (2013.01); *H04L 27/362* (2013.01)

(58) Field of Classification Search
CPC ................ H04L 5/0094; H04L 5/0044; H04L 5/0051; H04L 27/362; H04L 5/00; H04L 5/0048;
(Continued)

(56) References Cited

U.S. PATENT DOCUMENTS

2023/0180165 A1* 6/2023 Su .......................... H04L 7/007 370/503

FOREIGN PATENT DOCUMENTS

WO 2020186179 A1 9/2020

OTHER PUBLICATIONS

3rd Generation Partnership Project; Technical Specification Group Radio Access Network; NR; Physical channels and modulation (Release 16), 3GPP TS 38.211 V16.5.0 (Mar. 2021), Technical Specification, total 134 pages.

(Continued)

*Primary Examiner* — Shawn D Miller
(74) *Attorney, Agent, or Firm* — HAUPTMAN HAM, LLP

(57) ABSTRACT

A communication method and apparatus. A plurality of signals included in a first sequence to M subcarrier blocks used to transmit a reference signal are mapped, where an $m^{th}$ subcarrier block includes $Q_m$ subcarriers, and a plurality of signals mapped to a plurality of consecutive subcarriers at a rear location in the $m^{th}$ subcarrier block are the same as a plurality of signals mapped to a plurality of consecutive subcarriers at a front location in a $(\mathrm{mod}(m, M)+1)^{th}$ subcarrier block. Signals transmitted on a plurality of reference signal subcarrier blocks are jointly designed, and a cyclic redundancy characteristic is formed in the plurality of reference signal (for example, PTRS) subcarrier blocks.

20 Claims, 12 Drawing Sheets

(58) Field of Classification Search
CPC ......... H04L 25/02; H04L 27/26; H04L 27/36; H04L 25/0228; H04J 13/00; H04J 13/0062
See application file for complete search history.

(56) References Cited

OTHER PUBLICATIONS

3rd Generation Partnership Project; Technical Specification Group Radio Access Network; NR; Physical layer procedures for control (Release 16), 3GPP TS 38.213 V16.6.0 (Jun. 2021), Technical Specification, total 187 pages.
3rd Generation Partnership Project; Technical Specification Group Radio Access Network; NR; Physical layer procedures for data (Release 16), 3GPP TS 38.214 V16.5.0 (Mar. 2021), Technical Specification, total 171 pages.
International Search Report issued in corresponding International Application No. PCT/CN2022/096686, dated Nov. 2, 2022, pp. 1-5.

* cited by examiner

| | | | | | | | | | | | | | | | | |
|---|---|---|---|---|---|---|---|---|---|---|---|---|---|---|---|---|
| 1 | 0.7071 | +0.7071i | 0.7071 | +0.7071 | 0.7071 | +0.7071i | 0.7071 | -0.7071i | -0.7071 | -0.7071i | 0.7071 | +0.7071i | -0.7071 | -0.7071i | 0.7071 | -0.7071i |
| 2 | 0.7071 | +0.7071i | 0.7071 | +0.7071 | 0.7071 | +0.7071i | -0.7071 | +0.7071i | -0.7071 | -0.7071i | 0.7071 | +0.7071i | -0.7071 | -0.7071i | -0.7071 | +0.7071i |
| 3 | 0.7071 | +0.7071i | 0.7071 | +0.7071 | 0.7071 | -0.7071i | 0.7071 | +0.7071i | 0.7071 | +0.7071i | -0.7071 | -0.7071i | 0.7071 | -0.7071i | -0.7071 | -0.7071i |
| 4 | 0.7071 | +0.7071i | 0.7071 | +0.7071 | 0.7071 | -0.7071i | -0.7071 | -0.7071i | 0.7071 | +0.7071i | -0.7071 | -0.7071i | 0.7071 | -0.7071i | 0.7071 | +0.7071i |
| 5 | 0.7071 | +0.7071i | 0.7071 | +0.7071 | -0.7071 | +0.7071i | 0.7071 | +0.7071i | 0.7071 | +0.7071i | -0.7071 | -0.7071i | -0.7071 | +0.7071i | -0.7071 | -0.7071i |
| 6 | 0.7071 | +0.7071i | 0.7071 | +0.7071 | -0.7071 | +0.7071i | -0.7071 | -0.7071i | 0.7071 | +0.7071i | -0.7071 | -0.7071i | -0.7071 | +0.7071i | 0.7071 | +0.7071i |
| 7 | 0.7071 | +0.7071i | 0.7071 | +0.7071 | -0.7071 | -0.7071i | 0.7071 | -0.7071i | -0.7071 | -0.7071i | 0.7071 | +0.7071i | 0.7071 | +0.7071i | 0.7071 | -0.7071i |
| 8 | 0.7071 | +0.7071i | 0.7071 | +0.7071 | -0.7071 | -0.7071i | -0.7071 | +0.7071i | -0.7071 | -0.7071i | 0.7071 | +0.7071i | 0.7071 | +0.7071i | -0.7071 | +0.7071i |
| 9 | 0.7071 | +0.7071i | 0.7071 | -0.7071 | 0.7071 | +0.7071i | 0.7071 | +0.7071i | -0.7071 | -0.7071i | 0.7071 | -0.7071i | -0.7071 | -0.7071i | 0.7071 | +0.7071i |
| 10 | 0.7071 | +0.7071i | 0.7071 | -0.7071 | 0.7071 | +0.7071i | -0.7071 | -0.7071i | -0.7071 | -0.7071i | 0.7071 | -0.7071i | -0.7071 | -0.7071i | -0.7071 | -0.7071i |
| 11 | 0.7071 | +0.7071i | 0.7071 | -0.7071 | 0.7071 | -0.7071i | 0.7071 | -0.7071i | 0.7071 | +0.7071i | -0.7071 | +0.7071i | 0.7071 | -0.7071i | -0.7071 | +0.7071i |
| 12 | 0.7071 | +0.7071i | 0.7071 | -0.7071 | 0.7071 | -0.7071i | -0.7071 | +0.7071i | 0.7071 | +0.7071i | -0.7071 | +0.7071i | 0.7071 | -0.7071i | 0.7071 | -0.7071i |
| 13 | 0.7071 | +0.7071i | 0.7071 | -0.7071 | -0.7071 | +0.7071i | 0.7071 | -0.7071i | 0.7071 | +0.7071i | -0.7071 | +0.7071i | -0.7071 | +0.7071i | -0.7071 | +0.7071i |
| 14 | 0.7071 | +0.7071i | 0.7071 | -0.7071 | -0.7071 | +0.7071i | -0.7071 | +0.7071i | 0.7071 | +0.7071i | -0.7071 | +0.7071i | -0.7071 | +0.7071i | 0.7071 | -0.7071i |
| 15 | 0.7071 | +0.7071i | 0.7071 | -0.7071 | -0.7071 | -0.7071i | 0.7071 | +0.7071i | -0.7071 | -0.7071i | 0.7071 | -0.7071i | 0.7071 | +0.7071i | 0.7071 | +0.7071i |
| 16 | 0.7071 | +0.7071i | 0.7071 | -0.7071 | -0.7071 | -0.7071i | -0.7071 | -0.7071i | -0.7071 | -0.7071i | 0.7071 | -0.7071i | 0.7071 | +0.7071i | -0.7071 | -0.7071i |
| 17 | 0.7071 | +0.7071i | -0.7071 | +0.7071 | 0.7071 | +0.7071i | 0.7071 | +0.7071i | -0.7071 | -0.7071i | -0.7071 | +0.7071i | -0.7071 | -0.7071i | 0.7071 | +0.7071i |
| 18 | 0.7071 | +0.7071i | -0.7071 | +0.7071 | 0.7071 | +0.7071i | -0.7071 | -0.7071i | -0.7071 | -0.7071i | -0.7071 | +0.7071i | -0.7071 | -0.7071i | -0.7071 | -0.7071i |
| 19 | 0.7071 | +0.7071i | -0.7071 | +0.7071 | 0.7071 | -0.7071i | 0.7071 | -0.7071i | 0.7071 | +0.7071i | 0.7071 | -0.7071i | 0.7071 | -0.7071i | -0.7071 | +0.7071i |
| 20 | 0.7071 | +0.7071i | -0.7071 | +0.7071 | 0.7071 | -0.7071i | -0.7071 | +0.7071i | 0.7071 | +0.7071i | 0.7071 | -0.7071i | 0.7071 | -0.7071i | 0.7071 | -0.7071i |
| 21 | 0.7071 | +0.7071i | -0.7071 | +0.7071 | -0.7071 | +0.7071i | 0.7071 | -0.7071i | 0.7071 | +0.7071i | 0.7071 | -0.7071i | -0.7071 | +0.7071i | -0.7071 | +0.7071i |
| 22 | 0.7071 | +0.7071i | -0.7071 | +0.7071 | -0.7071 | +0.7071i | -0.7071 | +0.7071i | 0.7071 | +0.7071i | 0.7071 | -0.7071i | -0.7071 | +0.7071i | 0.7071 | -0.7071i |
| 23 | 0.7071 | +0.7071i | -0.7071 | +0.7071 | -0.7071 | -0.7071i | 0.7071 | +0.7071i | -0.7071 | -0.7071i | -0.7071 | +0.7071i | 0.7071 | +0.7071i | 0.7071 | +0.7071i |
| 24 | 0.7071 | +0.7071i | -0.7071 | +0.7071 | -0.7071 | -0.7071i | -0.7071 | -0.7071i | -0.7071 | -0.7071i | -0.7071 | +0.7071i | 0.7071 | +0.7071i | -0.7071 | -0.7071i |
| 25 | 0.7071 | +0.7071i | -0.7071 | -0.7071 | 0.7071 | +0.7071i | 0.7071 | -0.7071i | -0.7071 | -0.7071i | -0.7071 | -0.7071i | -0.7071 | -0.7071i | 0.7071 | -0.7071i |
| 26 | 0.7071 | +0.7071i | -0.7071 | -0.7071 | 0.7071 | +0.7071i | -0.7071 | +0.7071i | -0.7071 | -0.7071i | -0.7071 | -0.7071i | -0.7071 | -0.7071i | -0.7071 | +0.7071i |
| 27 | 0.7071 | +0.7071i | -0.7071 | -0.7071 | 0.7071 | -0.7071i | 0.7071 | +0.7071i | 0.7071 | +0.7071i | 0.7071 | +0.7071i | 0.7071 | -0.7071i | -0.7071 | -0.7071i |
| 28 | 0.7071 | +0.7071i | -0.7071 | -0.7071 | 0.7071 | -0.7071i | -0.7071 | -0.7071i | 0.7071 | +0.7071i | 0.7071 | +0.7071i | 0.7071 | -0.7071i | 0.7071 | +0.7071i |
| 29 | 0.7071 | +0.7071i | -0.7071 | -0.7071 | -0.7071 | +0.7071i | 0.7071 | +0.7071i | 0.7071 | +0.7071i | 0.7071 | +0.7071i | -0.7071 | +0.7071i | -0.7071 | -0.7071i |
| 30 | 0.7071 | +0.7071i | -0.7071 | -0.7071 | -0.7071 | +0.7071i | -0.7071 | -0.7071i | 0.7071 | +0.7071i | 0.7071 | +0.7071i | -0.7071 | +0.7071i | 0.7071 | +0.7071i |
| 31 | 0.7071 | +0.7071i | -0.7071 | -0.7071 | -0.7071 | -0.7071i | 0.7071 | -0.7071i | -0.7071 | -0.7071i | -0.7071 | -0.7071i | 0.7071 | +0.7071i | 0.7071 | -0.7071i |
| 32 | 0.7071 | +0.7071i | -0.7071 | -0.7071 | -0.7071 | -0.7071i | -0.7071 | +0.7071i | -0.7071 | -0.7071i | -0.7071 | -0.7071i | 0.7071 | +0.7071i | -0.7071 | +0.7071i |
| 33 | 0.7071 | -0.7071i | 0.7071 | +0.7071 | 0.7071 | +0.7071i | 0.7071 | +0.7071i | 0.7071 | -0.7071i | -0.7071 | -0.7071i | 0.7071 | +0.7071i | -0.7071 | -0.7071i |
| 34 | 0.7071 | -0.7071i | 0.7071 | +0.7071 | 0.7071 | +0.7071i | -0.7071 | -0.7071i | 0.7071 | -0.7071i | -0.7071 | -0.7071i | 0.7071 | +0.7071i | 0.7071 | +0.7071i |
| 35 | 0.7071 | -0.7071i | 0.7071 | +0.7071 | 0.7071 | -0.7071i | 0.7071 | -0.7071i | -0.7071 | +0.7071i | 0.7071 | +0.7071i | -0.7071 | +0.7071i | 0.7071 | -0.7071i |
| 36 | 0.7071 | -0.7071i | 0.7071 | +0.7071 | 0.7071 | -0.7071i | -0.7071 | +0.7071i | -0.7071 | +0.7071i | 0.7071 | +0.7071i | -0.7071 | +0.7071i | -0.7071 | +0.7071i |
| 37 | 0.7071 | -0.7071i | 0.7071 | +0.7071 | -0.7071 | +0.7071i | 0.7071 | -0.7071i | -0.7071 | +0.7071i | 0.7071 | +0.7071i | 0.7071 | -0.7071i | 0.7071 | -0.7071i |
| 38 | 0.7071 | -0.7071i | 0.7071 | +0.7071 | -0.7071 | +0.7071i | -0.7071 | +0.7071i | -0.7071 | +0.7071i | 0.7071 | +0.7071i | 0.7071 | -0.7071i | -0.7071 | +0.7071i |
| 39 | 0.7071 | -0.7071i | 0.7071 | +0.7071 | -0.7071 | -0.7071i | 0.7071 | +0.7071i | 0.7071 | -0.7071i | -0.7071 | -0.7071i | -0.7071 | -0.7071i | -0.7071 | -0.7071i |
| 40 | 0.7071 | -0.7071i | 0.7071 | +0.7071 | -0.7071 | -0.7071i | -0.7071 | -0.7071i | 0.7071 | -0.7071i | -0.7071 | -0.7071i | -0.7071 | -0.7071i | 0.7071 | +0.7071i |
| 41 | 0.7071 | -0.7071i | 0.7071 | -0.7071 | 0.7071 | +0.7071i | 0.7071 | -0.7071i | 0.7071 | -0.7071i | -0.7071 | +0.7071i | 0.7071 | +0.7071i | -0.7071 | +0.7071i |
| 42 | 0.7071 | -0.7071i | 0.7071 | -0.7071 | 0.7071 | +0.7071i | -0.7071 | +0.7071i | 0.7071 | -0.7071i | -0.7071 | +0.7071i | 0.7071 | +0.7071i | 0.7071 | -0.7071i |
| 43 | 0.7071 | -0.7071i | 0.7071 | -0.7071 | 0.7071 | -0.7071i | 0.7071 | +0.7071i | -0.7071 | +0.7071i | 0.7071 | -0.7071i | -0.7071 | +0.7071i | 0.7071 | +0.7071i |
| 44 | 0.7071 | -0.7071i | 0.7071 | -0.7071 | 0.7071 | -0.7071i | -0.7071 | -0.7071i | -0.7071 | +0.7071i | 0.7071 | -0.7071i | -0.7071 | +0.7071i | -0.7071 | -0.7071i |

FIG. 5a

| | | | | | | | | |
|---|---|---|---|---|---|---|---|---|
| 44 | 0.7071 -0.7071i | 0.7071 -0.7071 | 0.7071 -0.7071i | -0.7071 -0.7071i | -0.7071 +0.7071i | 0.7071 -0.7071i | -0.7071 +0.7071i | -0.7071 -0.7071i |
| 45 | 0.7071 -0.7071i | 0.7071 -0.7071 | -0.7071 +0.7071i | 0.7071 +0.7071i | -0.7071 +0.7071i | 0.7071 -0.7071i | 0.7071 -0.7071i | 0.7071 +0.7071i |
| 46 | 0.7071 -0.7071i | 0.7071 -0.7071 | -0.7071 +0.7071i | -0.7071 -0.7071i | -0.7071 +0.7071i | 0.7071 -0.7071i | 0.7071 -0.7071i | -0.7071 -0.7071i |
| 47 | 0.7071 -0.7071i | 0.7071 -0.7071 | -0.7071 -0.7071i | 0.7071 -0.7071i | 0.7071 -0.7071i | -0.7071 +0.7071i | -0.7071 -0.7071i | -0.7071 +0.7071i |
| 48 | 0.7071 -0.7071i | 0.7071 -0.7071 | -0.7071 -0.7071i | -0.7071 +0.7071i | 0.7071 -0.7071i | -0.7071 +0.7071i | -0.7071 -0.7071i | 0.7071 -0.7071i |
| 49 | 0.7071 -0.7071i | -0.7071 +0.7071 | 0.7071 +0.7071i | 0.7071 -0.7071i | 0.7071 -0.7071i | 0.7071 -0.7071i | 0.7071 +0.7071i | -0.7071 +0.7071i |
| 50 | 0.7071 -0.7071i | -0.7071 +0.7071 | 0.7071 +0.7071i | -0.7071 +0.7071i | 0.7071 -0.7071i | 0.7071 -0.7071i | 0.7071 +0.7071i | 0.7071 -0.7071i |
| 51 | 0.7071 -0.7071i | -0.7071 +0.7071 | 0.7071 -0.7071i | 0.7071 +0.7071i | -0.7071 +0.7071i | -0.7071 +0.7071i | -0.7071 +0.7071i | 0.7071 +0.7071i |
| 52 | 0.7071 -0.7071i | -0.7071 +0.7071 | 0.7071 -0.7071i | -0.7071 -0.7071i | -0.7071 +0.7071i | -0.7071 +0.7071i | -0.7071 +0.7071i | -0.7071 -0.7071i |
| 53 | 0.7071 -0.7071i | -0.7071 +0.7071 | -0.7071 +0.7071i | 0.7071 +0.7071i | -0.7071 +0.7071i | -0.7071 +0.7071i | 0.7071 -0.7071i | 0.7071 +0.7071i |
| 54 | 0.7071 -0.7071i | -0.7071 +0.7071 | -0.7071 +0.7071i | -0.7071 -0.7071i | -0.7071 +0.7071i | -0.7071 +0.7071i | 0.7071 -0.7071i | -0.7071 -0.7071i |
| 55 | 0.7071 -0.7071i | -0.7071 +0.7071 | -0.7071 -0.7071i | 0.7071 -0.7071i | 0.7071 -0.7071i | 0.7071 -0.7071i | -0.7071 -0.7071i | -0.7071 +0.7071i |
| 56 | 0.7071 -0.7071i | -0.7071 +0.7071 | -0.7071 -0.7071i | -0.7071 +0.7071i | 0.7071 -0.7071i | 0.7071 -0.7071i | -0.7071 -0.7071i | 0.7071 -0.7071i |
| 57 | 0.7071 -0.7071i | -0.7071 -0.7071 | 0.7071 +0.7071i | 0.7071 +0.7071i | 0.7071 -0.7071i | 0.7071 +0.7071i | 0.7071 +0.7071i | -0.7071 -0.7071i |
| 58 | 0.7071 -0.7071i | -0.7071 -0.7071 | 0.7071 +0.7071i | -0.7071 -0.7071i | 0.7071 -0.7071i | 0.7071 +0.7071i | 0.7071 +0.7071i | 0.7071 +0.7071i |
| 59 | 0.7071 -0.7071i | -0.7071 -0.7071 | 0.7071 -0.7071i | 0.7071 -0.7071i | -0.7071 +0.7071i | -0.7071 -0.7071i | -0.7071 +0.7071i | 0.7071 -0.7071i |
| 60 | 0.7071 -0.7071i | -0.7071 -0.7071 | 0.7071 -0.7071i | -0.7071 +0.7071i | -0.7071 +0.7071i | -0.7071 -0.7071i | -0.7071 +0.7071i | -0.7071 +0.7071i |
| 61 | 0.7071 -0.7071i | -0.7071 -0.7071 | -0.7071 +0.7071i | 0.7071 -0.7071i | -0.7071 +0.7071i | -0.7071 -0.7071i | 0.7071 -0.7071i | 0.7071 -0.7071i |
| 62 | 0.7071 -0.7071i | -0.7071 -0.7071 | -0.7071 +0.7071i | -0.7071 +0.7071i | -0.7071 +0.7071i | -0.7071 -0.7071i | 0.7071 -0.7071i | -0.7071 +0.7071i |
| 63 | 0.7071 -0.7071i | -0.7071 -0.7071 | -0.7071 -0.7071i | 0.7071 +0.7071i | 0.7071 -0.7071i | 0.7071 +0.7071i | -0.7071 -0.7071i | -0.7071 -0.7071i |
| 64 | 0.7071 -0.7071i | -0.7071 -0.7071 | -0.7071 -0.7071i | -0.7071 -0.7071i | 0.7071 -0.7071i | 0.7071 +0.7071i | -0.7071 -0.7071i | 0.7071 +0.7071i |
| 65 | -0.7071 +0.7071i | 0.7071 +0.7071 | 0.7071 +0.7071i | 0.7071 +0.7071i | -0.7071 +0.7071i | -0.7071 -0.7071i | 0.7071 +0.7071i | -0.7071 -0.7071i |
| 66 | -0.7071 +0.7071i | 0.7071 +0.7071 | 0.7071 +0.7071i | -0.7071 -0.7071i | -0.7071 +0.7071i | -0.7071 -0.7071i | 0.7071 +0.7071i | 0.7071 +0.7071i |
| 67 | -0.7071 +0.7071i | 0.7071 +0.7071 | 0.7071 -0.7071i | 0.7071 -0.7071i | 0.7071 -0.7071i | 0.7071 +0.7071i | -0.7071 +0.7071i | 0.7071 -0.7071i |
| 68 | -0.7071 +0.7071i | 0.7071 +0.7071 | 0.7071 -0.7071i | -0.7071 +0.7071i | 0.7071 -0.7071i | 0.7071 +0.7071i | -0.7071 +0.7071i | -0.7071 +0.7071i |
| 69 | -0.7071 +0.7071i | 0.7071 +0.7071 | -0.7071 +0.7071i | 0.7071 -0.7071i | 0.7071 -0.7071i | 0.7071 +0.7071i | 0.7071 -0.7071i | 0.7071 -0.7071i |
| 70 | -0.7071 +0.7071i | 0.7071 +0.7071 | -0.7071 +0.7071i | -0.7071 +0.7071i | 0.7071 -0.7071i | 0.7071 +0.7071i | 0.7071 -0.7071i | -0.7071 +0.7071i |
| 71 | -0.7071 +0.7071i | 0.7071 +0.7071 | -0.7071 -0.7071i | 0.7071 +0.7071i | -0.7071 +0.7071i | -0.7071 -0.7071i | -0.7071 -0.7071i | -0.7071 -0.7071i |
| 72 | -0.7071 +0.7071i | 0.7071 +0.7071 | -0.7071 -0.7071i | -0.7071 -0.7071i | -0.7071 +0.7071i | -0.7071 -0.7071i | -0.7071 -0.7071i | 0.7071 +0.7071i |
| 73 | -0.7071 +0.7071i | 0.7071 -0.7071 | 0.7071 +0.7071i | 0.7071 -0.7071i | -0.7071 +0.7071i | -0.7071 +0.7071i | 0.7071 +0.7071i | -0.7071 +0.7071i |
| 74 | -0.7071 +0.7071i | 0.7071 -0.7071 | 0.7071 +0.7071i | -0.7071 +0.7071i | -0.7071 +0.7071i | -0.7071 +0.7071i | 0.7071 +0.7071i | 0.7071 -0.7071i |
| 75 | -0.7071 +0.7071i | 0.7071 -0.7071 | 0.7071 -0.7071i | 0.7071 +0.7071i | 0.7071 -0.7071i | 0.7071 -0.7071i | -0.7071 +0.7071i | 0.7071 +0.7071i |
| 76 | -0.7071 +0.7071i | 0.7071 -0.7071 | 0.7071 -0.7071i | -0.7071 -0.7071i | 0.7071 -0.7071i | 0.7071 -0.7071i | -0.7071 +0.7071i | -0.7071 -0.7071i |
| 77 | -0.7071 +0.7071i | 0.7071 -0.7071 | -0.7071 +0.7071i | 0.7071 +0.7071i | 0.7071 -0.7071i | 0.7071 -0.7071i | 0.7071 -0.7071i | 0.7071 +0.7071i |
| 78 | -0.7071 +0.7071i | 0.7071 -0.7071 | -0.7071 +0.7071i | -0.7071 -0.7071i | 0.7071 -0.7071i | 0.7071 -0.7071i | 0.7071 -0.7071i | -0.7071 -0.7071i |
| 79 | -0.7071 +0.7071i | 0.7071 -0.7071 | -0.7071 -0.7071i | 0.7071 -0.7071i | -0.7071 +0.7071i | -0.7071 +0.7071i | -0.7071 -0.7071i | -0.7071 +0.7071i |
| 80 | -0.7071 +0.7071i | 0.7071 -0.7071 | -0.7071 -0.7071i | -0.7071 +0.7071i | -0.7071 +0.7071i | -0.7071 +0.7071i | -0.7071 -0.7071i | 0.7071 -0.7071i |
| 81 | -0.7071 +0.7071i | -0.7071 +0.7071 | 0.7071 +0.7071i | 0.7071 -0.7071i | -0.7071 +0.7071i | 0.7071 -0.7071i | 0.7071 +0.7071i | -0.7071 +0.7071i |
| 82 | -0.7071 +0.7071i | -0.7071 +0.7071 | 0.7071 +0.7071i | -0.7071 +0.7071i | -0.7071 +0.7071i | 0.7071 -0.7071i | 0.7071 +0.7071i | 0.7071 -0.7071i |
| 83 | -0.7071 +0.7071i | -0.7071 +0.7071 | 0.7071 -0.7071i | 0.7071 +0.7071i | 0.7071 -0.7071i | -0.7071 +0.7071i | -0.7071 +0.7071i | 0.7071 +0.7071i |
| 84 | -0.7071 +0.7071i | -0.7071 +0.7071 | 0.7071 -0.7071i | -0.7071 -0.7071i | 0.7071 -0.7071i | -0.7071 +0.7071i | -0.7071 +0.7071i | -0.7071 -0.7071i |
| 85 | -0.7071 +0.7071i | -0.7071 +0.7071 | -0.7071 +0.7071i | 0.7071 +0.7071i | 0.7071 -0.7071i | -0.7071 +0.7071i | 0.7071 -0.7071i | 0.7071 +0.7071i |
| 86 | -0.7071 +0.7071i | -0.7071 +0.7071 | -0.7071 +0.7071i | -0.7071 -0.7071i | 0.7071 -0.7071i | -0.7071 +0.7071i | 0.7071 -0.7071i | -0.7071 -0.7071i |
| 87 | -0.7071 +0.7071i | -0.7071 +0.7071 | -0.7071 -0.7071i | 0.7071 -0.7071i | -0.7071 +0.7071i | 0.7071 -0.7071i | -0.7071 -0.7071i | -0.7071 +0.7071i |
| 88 | -0.7071 +0.7071i | -0.7071 +0.7071 | -0.7071 -0.7071i | -0.7071 +0.7071i | -0.7071 +0.7071i | 0.7071 -0.7071i | -0.7071 -0.7071i | 0.7071 -0.7071i |

FIG. 5b

| | | | | | | | | | | | | | | | | |
|---|---|---|---|---|---|---|---|---|---|---|---|---|---|---|---|---|
| 89 | -0.7071 | +0.7071i | -0.7071 | -0.7071 | 0.7071 | +0.7071i | 0.7071 | +0.7071i | -0.7071 | +0.7071i | 0.7071 | +0.7071i | 0.7071 | +0.7071i | -0.7071 | -0.7071i |
| 90 | -0.7071 | +0.7071i | -0.7071 | -0.7071 | 0.7071 | +0.7071i | -0.7071 | -0.7071i | -0.7071 | +0.7071i | 0.7071 | +0.7071i | 0.7071 | +0.7071i | 0.7071 | +0.7071i |
| 91 | -0.7071 | +0.7071i | -0.7071 | -0.7071 | 0.7071 | -0.7071i | 0.7071 | -0.7071i | 0.7071 | -0.7071i | -0.7071 | -0.7071i | -0.7071 | +0.7071i | 0.7071 | -0.7071i |
| 92 | -0.7071 | +0.7071i | -0.7071 | -0.7071 | 0.7071 | -0.7071i | -0.7071 | +0.7071i | 0.7071 | -0.7071i | -0.7071 | -0.7071i | -0.7071 | +0.7071i | -0.7071 | +0.7071i |
| 93 | -0.7071 | +0.7071i | -0.7071 | -0.7071 | -0.7071 | +0.7071i | 0.7071 | -0.7071i | 0.7071 | -0.7071i | -0.7071 | -0.7071i | 0.7071 | -0.7071i | 0.7071 | -0.7071i |
| 94 | -0.7071 | +0.7071i | -0.7071 | -0.7071 | -0.7071 | +0.7071i | -0.7071 | +0.7071i | 0.7071 | -0.7071i | -0.7071 | -0.7071i | 0.7071 | -0.7071i | -0.7071 | +0.7071i |
| 95 | -0.7071 | +0.7071i | -0.7071 | -0.7071 | -0.7071 | -0.7071i | 0.7071 | +0.7071i | -0.7071 | +0.7071i | 0.7071 | +0.7071i | -0.7071 | -0.7071i | -0.7071 | -0.7071i |
| 96 | -0.7071 | +0.7071i | -0.7071 | -0.7071 | -0.7071 | -0.7071i | -0.7071 | -0.7071i | -0.7071 | +0.7071i | 0.7071 | +0.7071i | -0.7071 | -0.7071i | 0.7071 | +0.7071i |
| 97 | -0.7071 | -0.7071i | 0.7071 | +0.7071 | 0.7071 | +0.7071i | 0.7071 | -0.7071i | 0.7071 | +0.7071i | 0.7071 | +0.7071i | -0.7071 | -0.7071i | 0.7071 | -0.7071i |
| 98 | -0.7071 | -0.7071i | 0.7071 | +0.7071 | 0.7071 | +0.7071i | -0.7071 | +0.7071i | 0.7071 | +0.7071i | 0.7071 | +0.7071i | -0.7071 | -0.7071i | -0.7071 | +0.7071i |
| 99 | -0.7071 | -0.7071i | 0.7071 | +0.7071 | 0.7071 | -0.7071i | 0.7071 | +0.7071i | -0.7071 | -0.7071i | -0.7071 | -0.7071i | 0.7071 | -0.7071i | -0.7071 | -0.7071i |
| 100 | -0.7071 | -0.7071i | 0.7071 | +0.7071 | 0.7071 | -0.7071i | -0.7071 | -0.7071i | -0.7071 | -0.7071i | -0.7071 | -0.7071i | 0.7071 | -0.7071i | 0.7071 | +0.7071i |
| 101 | -0.7071 | -0.7071i | 0.7071 | +0.7071 | -0.7071 | +0.7071i | 0.7071 | +0.7071i | -0.7071 | -0.7071i | -0.7071 | -0.7071i | -0.7071 | +0.7071i | -0.7071 | -0.7071i |
| 102 | -0.7071 | -0.7071i | 0.7071 | +0.7071 | -0.7071 | +0.7071i | -0.7071 | -0.7071i | -0.7071 | -0.7071i | -0.7071 | -0.7071i | -0.7071 | +0.7071i | 0.7071 | +0.7071i |
| 103 | -0.7071 | -0.7071i | 0.7071 | +0.7071 | -0.7071 | -0.7071i | 0.7071 | -0.7071i | 0.7071 | +0.7071i | 0.7071 | +0.7071i | 0.7071 | +0.7071i | 0.7071 | -0.7071i |
| 104 | -0.7071 | -0.7071i | 0.7071 | +0.7071 | -0.7071 | -0.7071i | -0.7071 | +0.7071i | 0.7071 | +0.7071i | 0.7071 | +0.7071i | 0.7071 | +0.7071i | -0.7071 | +0.7071i |
| 105 | -0.7071 | -0.7071i | 0.7071 | -0.7071 | 0.7071 | +0.7071i | 0.7071 | +0.7071i | 0.7071 | +0.7071i | 0.7071 | -0.7071i | -0.7071 | -0.7071i | 0.7071 | +0.7071i |
| 106 | -0.7071 | -0.7071i | 0.7071 | -0.7071 | 0.7071 | +0.7071i | -0.7071 | -0.7071i | 0.7071 | +0.7071i | 0.7071 | -0.7071i | -0.7071 | -0.7071i | -0.7071 | -0.7071i |
| 107 | -0.7071 | -0.7071i | 0.7071 | -0.7071 | 0.7071 | -0.7071i | 0.7071 | -0.7071i | -0.7071 | -0.7071i | -0.7071 | +0.7071i | 0.7071 | -0.7071i | -0.7071 | +0.7071i |
| 108 | -0.7071 | -0.7071i | 0.7071 | -0.7071 | 0.7071 | -0.7071i | -0.7071 | +0.7071i | -0.7071 | -0.7071i | -0.7071 | +0.7071i | 0.7071 | -0.7071i | 0.7071 | -0.7071i |
| 109 | -0.7071 | -0.7071i | 0.7071 | -0.7071 | -0.7071 | +0.7071i | 0.7071 | -0.7071i | -0.7071 | -0.7071i | -0.7071 | +0.7071i | -0.7071 | +0.7071i | -0.7071 | +0.7071i |
| 110 | -0.7071 | -0.7071i | 0.7071 | -0.7071 | -0.7071 | +0.7071i | -0.7071 | +0.7071i | -0.7071 | -0.7071i | -0.7071 | +0.7071i | -0.7071 | +0.7071i | 0.7071 | -0.7071i |
| 111 | -0.7071 | -0.7071i | 0.7071 | -0.7071 | -0.7071 | -0.7071i | 0.7071 | +0.7071i | 0.7071 | +0.7071i | 0.7071 | -0.7071i | 0.7071 | +0.7071i | 0.7071 | +0.7071i |
| 112 | -0.7071 | -0.7071i | 0.7071 | -0.7071 | -0.7071 | -0.7071i | -0.7071 | -0.7071i | 0.7071 | +0.7071i | 0.7071 | -0.7071i | 0.7071 | +0.7071i | -0.7071 | -0.7071i |
| 113 | -0.7071 | -0.7071i | -0.7071 | +0.7071 | 0.7071 | +0.7071i | 0.7071 | +0.7071i | 0.7071 | +0.7071i | -0.7071 | +0.7071i | -0.7071 | -0.7071i | 0.7071 | +0.7071i |
| 114 | -0.7071 | -0.7071i | -0.7071 | +0.7071 | 0.7071 | +0.7071i | -0.7071 | -0.7071i | 0.7071 | +0.7071i | -0.7071 | +0.7071i | -0.7071 | -0.7071i | -0.7071 | -0.7071i |
| 115 | -0.7071 | -0.7071i | -0.7071 | +0.7071 | 0.7071 | -0.7071i | 0.7071 | -0.7071i | -0.7071 | -0.7071i | 0.7071 | -0.7071i | 0.7071 | -0.7071i | -0.7071 | +0.7071i |
| 116 | -0.7071 | -0.7071i | -0.7071 | +0.7071 | 0.7071 | -0.7071i | -0.7071 | +0.7071i | -0.7071 | -0.7071i | 0.7071 | -0.7071i | 0.7071 | -0.7071i | 0.7071 | -0.7071i |
| 117 | -0.7071 | -0.7071i | -0.7071 | +0.7071 | -0.7071 | +0.7071i | 0.7071 | -0.7071i | -0.7071 | -0.7071i | 0.7071 | -0.7071i | -0.7071 | +0.7071i | -0.7071 | +0.7071i |
| 118 | -0.7071 | -0.7071i | -0.7071 | +0.7071 | -0.7071 | +0.7071i | -0.7071 | +0.7071i | -0.7071 | -0.7071i | 0.7071 | -0.7071i | -0.7071 | +0.7071i | 0.7071 | -0.7071i |
| 119 | -0.7071 | -0.7071i | -0.7071 | +0.7071 | -0.7071 | -0.7071i | 0.7071 | +0.7071i | 0.7071 | +0.7071i | -0.7071 | +0.7071i | 0.7071 | +0.7071i | 0.7071 | +0.7071i |
| 120 | -0.7071 | -0.7071i | -0.7071 | +0.7071 | -0.7071 | -0.7071i | -0.7071 | -0.7071i | 0.7071 | +0.7071i | -0.7071 | +0.7071i | 0.7071 | +0.7071i | -0.7071 | -0.7071i |
| 121 | -0.7071 | -0.7071i | -0.7071 | -0.7071 | 0.7071 | +0.7071i | 0.7071 | -0.7071i | 0.7071 | +0.7071i | -0.7071 | -0.7071i | -0.7071 | -0.7071i | 0.7071 | -0.7071i |
| 122 | -0.7071 | -0.7071i | -0.7071 | -0.7071 | 0.7071 | +0.7071i | -0.7071 | +0.7071i | 0.7071 | +0.7071i | -0.7071 | -0.7071i | -0.7071 | -0.7071i | -0.7071 | +0.7071i |
| 123 | -0.7071 | -0.7071i | -0.7071 | -0.7071 | 0.7071 | -0.7071i | 0.7071 | +0.7071i | -0.7071 | -0.7071i | 0.7071 | +0.7071i | 0.7071 | -0.7071i | -0.7071 | -0.7071i |
| 124 | -0.7071 | -0.7071i | -0.7071 | -0.7071 | 0.7071 | -0.7071i | -0.7071 | -0.7071i | -0.7071 | -0.7071i | 0.7071 | +0.7071i | 0.7071 | -0.7071i | 0.7071 | +0.7071i |
| 125 | -0.7071 | -0.7071i | -0.7071 | -0.7071 | -0.7071 | +0.7071i | 0.7071 | +0.7071i | -0.7071 | -0.7071i | 0.7071 | +0.7071i | -0.7071 | +0.7071i | -0.7071 | -0.7071i |
| 126 | -0.7071 | -0.7071i | -0.7071 | -0.7071 | -0.7071 | +0.7071i | -0.7071 | -0.7071i | -0.7071 | -0.7071i | 0.7071 | +0.7071i | -0.7071 | +0.7071i | 0.7071 | +0.7071i |
| 127 | -0.7071 | -0.7071i | -0.7071 | -0.7071 | -0.7071 | -0.7071i | 0.7071 | -0.7071i | 0.7071 | +0.7071i | -0.7071 | -0.7071i | 0.7071 | +0.7071i | 0.7071 | -0.7071i |
| 128 | -0.7071 | -0.7071i | -0.7071 | -0.7071 | -0.7071 | -0.7071i | -0.7071 | +0.7071i | 0.7071 | +0.7071i | -0.7071 | -0.7071i | 0.7071 | +0.7071i | -0.7071 | +0.7071i |

FIG. 5c

COMMUNICATION METHOD AND APPARATUS

CROSS-REFERENCE TO RELATED APPLICATIONS

This application is a continuation of International Application No. PCT/CN2022/096686, filed on Jun. 1, 2022, which claims priority to Chinese Patent Application No. 202110670099.6, filed on Jun. 17, 2021. The disclosures of the aforementioned applications are hereby incorporated by reference in their entireties.

BACKGROUND

A high frequency (for example, a frequency band above 6 GHz) has abundant frequency band resources, and therefore has become a research and development hotspot in the industry for meeting increasing communication demands. In addition to high bandwidth and a highly integrated antenna array that are used to achieve a high throughput, significant features of the high frequency include a severe intermediate radio frequency distortion problem.

Phase noise is used as an example. As a frequency band increases, a higher power spectral density of the phase noise indicates greater impact on a received signal, that is, a higher working frequency indicates larger phase noise. In addition, to improve transmission effectiveness, higher-order modulation, for example, 16 quadrature amplitude modulation (quadrature amplitude modulation, QAM), 64 QAM, and 256 QAM, is usually used. Higher-order modulation is usually prone to be affected by the phase noise. Furthermore, on a same frequency band, demodulation performance of data with different modulation orders is also affected by the phase noise. A higher modulation order indicates higher sensitivity to the phase noise. Similarly, in a same modulation order, demodulation performance of data with different bit rates is also affected by the phase noise.

Therefore, how to improve data demodulation performance in a system with a high frequency or severe phase noise is an urgent problem to be resolved.

SUMMARY

Embodiments described herein provide a communication method and apparatus, to improve data demodulation performance.

According to a first aspect, a communication method is provided, including: mapping a plurality of signals included in a first sequence to M subcarrier blocks used to transmit a reference signal, where an $m^{th}$ subcarrier block includes $Q_m$ subcarriers, $Q_m$ is an integer greater than or equal to 2, m is all of integers from 1 to M, M is an integer greater than or equal to 2, the first sequence includes the plurality of signals, a plurality of signals mapped to a plurality of consecutive subcarriers at a rear location in the $m^{th}$ subcarrier block are the same as a plurality of signals mapped to a plurality of consecutive subcarriers at a front location in a $(\text{mod}(m, M)+1)^{th}$ subcarrier block, and mod(m, M) is a remainder obtained by dividing m by M; and then sending a mapped signal on each subcarrier block.

Optionally, the reference signal is used for phase tracking, or the reference signal is used to estimate phase noise. The reference signal includes but is not limited to a phase tracking reference signal (phase tracking reference signal, PTRS).

In at least one embodiment, signals transmitted on a plurality of reference signal subcarrier blocks are jointly designed, and a cyclic redundancy characteristic is formed in the plurality of reference signal (for example, PTRS) subcarrier blocks. The first sequence has a long length, so that a cyclic shift matrix larger than that in the conventional technology is constructed to estimate an ICI coefficient generated due to phase noise, to improve precision of estimating the ICI coefficient, so as to improve data demodulation performance.

In a possible implementation, a plurality of signals mapped to any subcarrier block are different.

In a possible implementation, in response to the first sequence being mapped to the M subcarrier blocks used to transmit a reference signal, the first sequence is mapped, in ascending order of subcarrier indexes and ascending order of signal indexes, to the M subcarrier blocks used to transmit a reference signal; or the first sequence is mapped, in ascending order of subcarrier indexes and descending order of signal indexes, to the M subcarrier blocks used to transmit a reference signal, so that the plurality of signals mapped to the plurality of consecutive subcarriers at the rear location in the $m^{th}$ subcarrier block are the same as the plurality of signals mapped to the plurality of consecutive subcarriers at the front location in the $(\text{mod}(m, M)+1)^{th}$ subcarrier block.

In a possible implementation, the $m^{th}$ subcarrier block includes a first subcarrier with a length of $\mathbf{p1}_m$, a second subcarrier with a length of $L_m$, and a third subcarrier with a length of $\mathbf{p2}_m$ that are sequentially arranged; and signals mapped to second subcarriers in the M subcarrier blocks are consecutive in the first sequence.

First, the first sequence is sequentially mapped to the second subcarriers in the M subcarrier blocks. Then, signals in the first sequence are mapped to first subcarriers and third subcarriers in the M subcarrier blocks in a manner in which signals mapped to each subcarrier block are cyclically consecutive, so that the plurality of signals mapped to the plurality of consecutive subcarriers at the rear location in the $m^{th}$ subcarrier block are the same as the plurality of signals mapped to the plurality of consecutive subcarriers at the front location in the $(\text{mod}(m, M)+1)^{th}$ subcarrier block.

In a possible implementation, a sum of lengths of the second subcarriers respectively included in the M subcarrier blocks is a length of the first sequence. That is, $L_1+L_2+\ldots+L_{M-1}+L_M=N$, where N is the length of the first sequence.

In a possible implementation, $L_m$ meets the following formula: $L_m=N/M$, $L_m=\text{floor}(N/M)$, $L_m=\text{floor}(N/M)+1$, $L_m=\text{ceil}(N/M)$, or $L_m=\text{ceil}(N/M)-1$, where floor is rounding down, ceil is rounding up, N is the length of the first sequence, and a value of m is some or all of the integers from 1 to M. That is, in the M subcarrier blocks, lengths of second subcarriers in all of the subcarrier blocks meet the formula, or lengths of second subcarriers in some of the subcarrier blocks meet the formula. Lengths L of second subcarriers in different subcarrier blocks are the same as much as possible. In response to the lengths of the second subcarriers in all of the subcarrier blocks being the same, a good cyclic characteristic is achieved, and demodulation performance is further improved.

In a possible implementation, a difference between $\mathbf{p1}_m$ and $\mathbf{p2}_m$ is less than or equal to 1, and the value of m is some or all of the integers from 1 to M. That is, in the M subcarrier blocks, a difference between lengths of first subcarriers and lengths of third subcarriers in all or some of the subcarrier blocks is less than or equal to 1. Redundancy on two sides of a subcarrier block is as equal as possible, to improve phase noise estimation performance and further improve demodulation performance.

In a possible implementation, a value of $Q_m$ is determined based on a value of $p1_m$ and/or a value of $p2_m$, and the value of m is some or all of the integers from 1 to M.

In a possible implementation, values of $p1_m$ and $p2_m$ are associated with at least one of $Q_m$, M, and N, and the value of m is some or all of the integers from 1 to M. In response to configuring a parameter for a terminal device, a network device configures only some parameters, and the terminal device obtains another parameter based on an association characteristic between parameters. The network device does not need to configure all parameters, to reduce overheads. In response to a base station allocating one or two parameters, another parameter is known, to reduce overheads.

In a possible implementation, $Q_m$=a*q, where q is a quantity of subcarriers in one resource block RB, a is an integer greater than or equal to 1, and the value of m is some or all of the integers from 1 to M. During resource scheduling, scheduling is usually performed based on a resource block. In at least one embodiment, a value of Q is an integer multiple of the quantity of subcarriers in one resource block RB, and scheduling is easy to perform.

In a possible implementation, the first sequence is any one of the following sequences: a ZC sequence, a quadrature amplitude modulation QAM sequence, a complementary sequence, and a pseudo-random sequence. Cyclic shifts of the ZC sequence are orthogonal. Therefore, each column of a matrix of the first sequence is orthogonal, and an inter-subcarrier interference ICI coefficient generated due to phase noise is better estimated. The time-domain/frequency-domain QAM sequence is easy to implement, and shares a signal modulation generator with data QAM modulation. The pseudo-random sequence is the same as a sequence generation method in an existing cellular communication system, and shares a generator. The complementary sequence is easy to implement.

According to a second aspect, a communication apparatus is provided. The apparatus has a function of implementing any one of the first aspect and the possible implementations of the first aspect. The function is implemented by hardware, or is implemented by hardware by executing corresponding software. The hardware or software includes one or more functional modules corresponding to the function.

For example, the apparatus includes: a processing module, configured to map a first sequence to M subcarrier blocks used to transmit a reference signal, where an $m^{th}$ subcarrier block includes $Q_m$ subcarriers, $Q_m$ is an integer greater than or equal to 2, m is all of integers from 1 to M, M is an integer greater than or equal to 2, the first sequence includes a plurality of signals, a plurality of signals mapped to a plurality of consecutive subcarriers at a rear location in the $m^{th}$ subcarrier block are the same as a plurality of signals mapped to a plurality of consecutive subcarriers at a front location in a $(\text{mod}(m, M)+1)^{th}$ subcarrier block, and mod(m, M) is a remainder obtained by dividing m by M; and a sending module, configured to send a mapped signal on each subcarrier.

In an example, the processing module is configured to map, in ascending order of subcarrier indexes and ascending order of signal indexes, the first sequence to the M subcarrier blocks used to transmit a reference signal; or is configured to map, in ascending order of subcarrier indexes and descending order of signal indexes, the first sequence to the M subcarrier blocks used to transmit a reference signal.

According to a third aspect, a communication apparatus is provided, includes a processor, and optionally, further includes a memory. The processor is coupled to the memory. The memory stores computer programs or instructions. The processor is configured to execute some or all of the computer programs or instructions in the memory. In response to the some or all of the computer programs or instructions being executed, a function in the method in any one of the first aspect and the possible implementations of the first aspect is implemented.

In a possible implementation, the apparatus further includes a transceiver, and the transceiver is configured to transmit a signal processed by the processor, or receive a signal input to the processor. The transceiver performs a sending action or a receiving action performed in any one of the first aspect and the possible implementations of the first aspect.

According to a fourth aspect, at least one embodiment provides a chip system. The chip system includes one or more processors (which is also referred to as processing circuits). The processor is electrically coupled to a memory (which is also referred to as a storage medium). The memory is located in the chip system, or is not located in the chip system. The memory is configured to store computer programs or instructions. The processor is configured to execute some or all of the computer programs or instructions in the memory. In response to the some or all of the computer programs or instructions being executed, a function in the method in any one of the first aspect and the possible implementations of the first aspect is implemented.

In a possible implementation, the chip system further includes an input/output interface (which is also referred to as a communication interface). The input/output interface is configured to output a signal processed by the processor, or receive a signal input to the processor. The input/output interface performs a sending action or a receiving action performed in any one of the first aspect and the possible implementations of the first aspect. Specifically, the output interface performs the sending action, and the input interface performs the receiving action.

In a possible implementation, the chip system includes a chip, or includes a chip and another discrete device.

According to a fifth aspect, a computer-readable storage medium is provided, and is configured to store a computer program. The computer program includes instructions used to implement a function in any one of the first aspect and the possible implementations of the first aspect.

According to a sixth aspect, a computer program product is provided. The computer program product includes computer program code. In response to the computer program code being run on a computer, the computer is enabled to perform the method performed in any one of the first aspect and the possible implementations of the first aspect.

For technical effects of the second aspect to the sixth aspect, refer to related descriptions in the first aspect. Details are not described.

BRIEF DESCRIPTION OF DRAWINGS

FIG. 5*a* is a schematic diagram of a sequence according to at least one embodiment;

FIG. 5*b* is a schematic diagram of a sequence according to at least one embodiment;

FIG. 5*c* is a schematic diagram of a sequence according to at least one embodiment;

DESCRIPTION OF EMBODIMENTS

For ease of understanding embodiments described herein, the following explains and describes some terms in at least one embodiment, to facilitate understanding by persons skilled in the art.

(1) A network device is a device that provides a random access function for a terminal device or a chip that is disposed in the device. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (a transmission and reception point, TRP, or a transmission point, TP), or the like, is a gNB or a transmission point (a TRP or a TP) in a 5G system such as an NR system or one or one group of antenna panels (including a plurality of antenna panels) of a base station in a 5G system, or is a network node forming a gNB or a transmission point, for example, a baseband unit (BBU) or a distributed unit (DU, distributed unit).

(2) A terminal device is also referred to as user equipment (user equipment, UE), a mobile station (mobile station, MS), a mobile terminal (mobile terminal, MT), a terminal, or the like, and is a device that provides voice and/or data connectivity for a user. For example, the terminal device includes a handheld device, an in-vehicle device, or the like that has a wireless connection function. Currently, the terminal device is a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal (for example, a sensor) in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a wireless terminal having a vehicle-to-vehicle (Vehicle-to-Vehicle, V2V) communication capability, or the like.

Figure 1A:
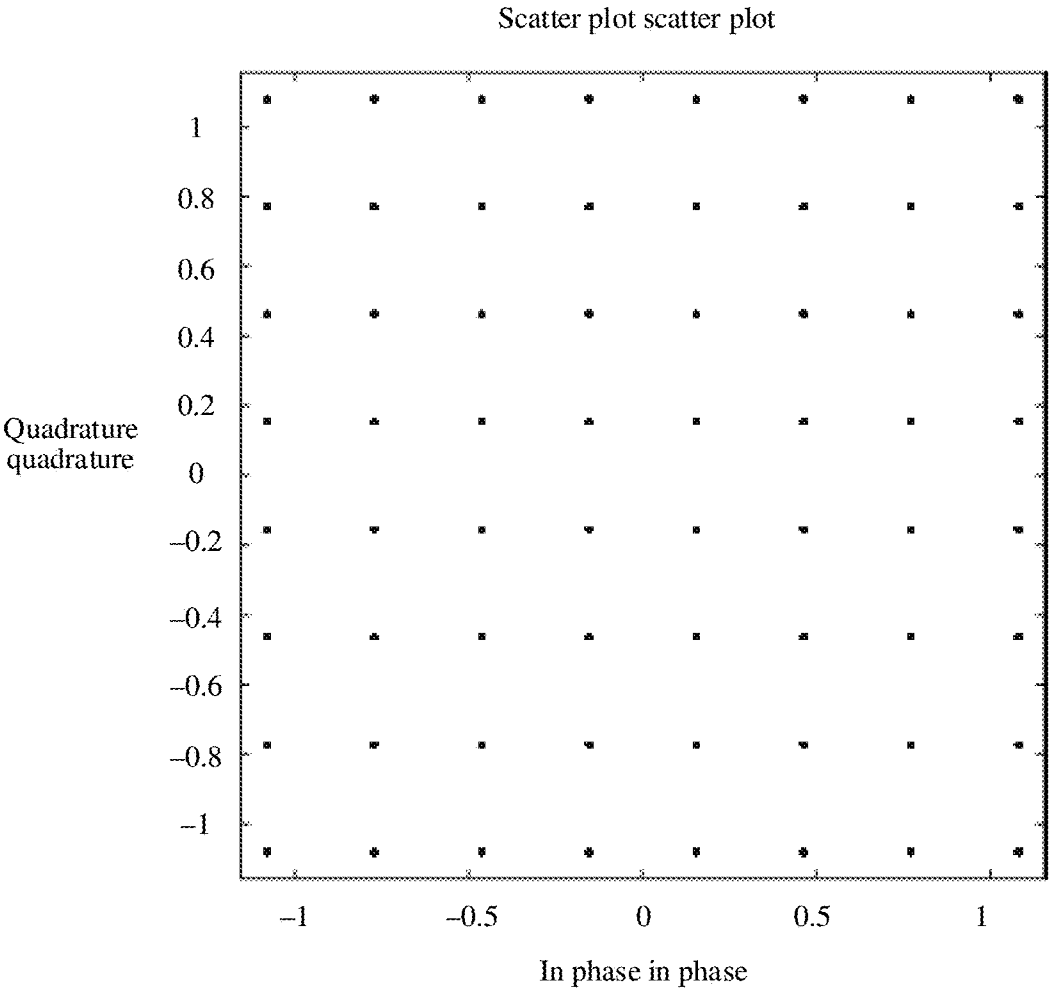
FIG. 1*a* is a schematic diagram of impact of phase noise on a received signal in frequency domain according to at least one embodiment.
Figure 1B:
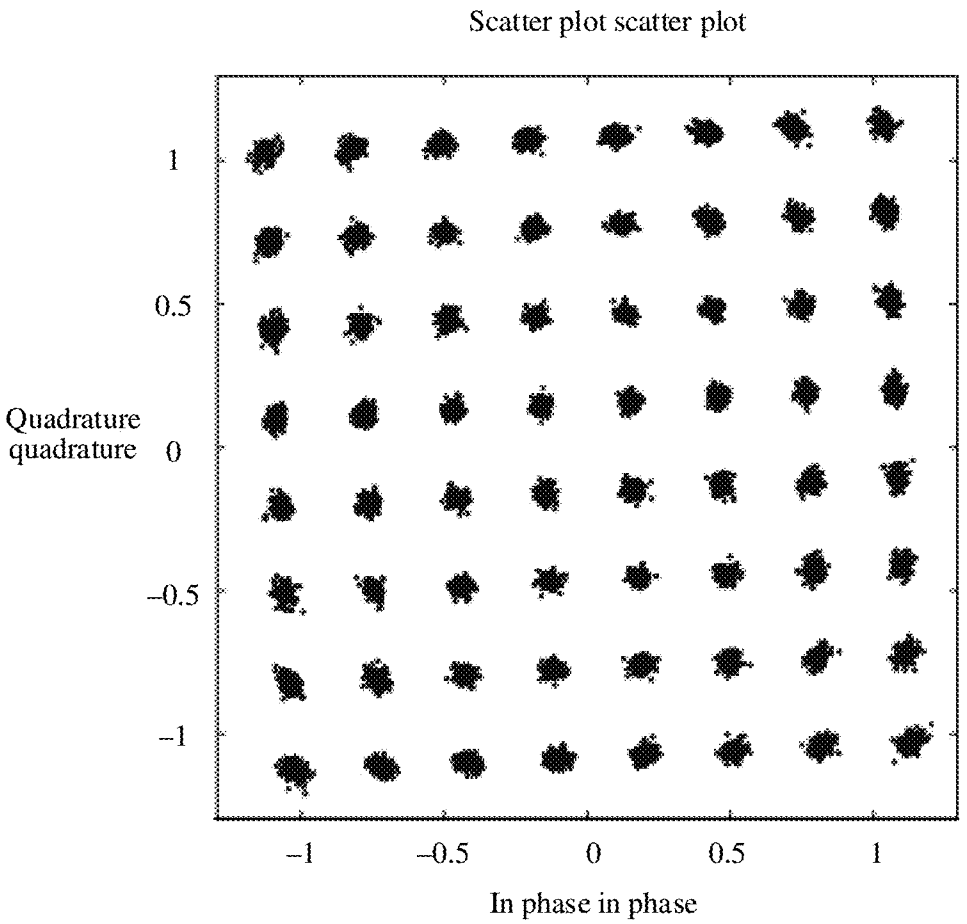
FIG. 1*b* is a schematic diagram of impact of phase noise on a received signal in frequency domain according to at least one embodiment.
Figure 1C:
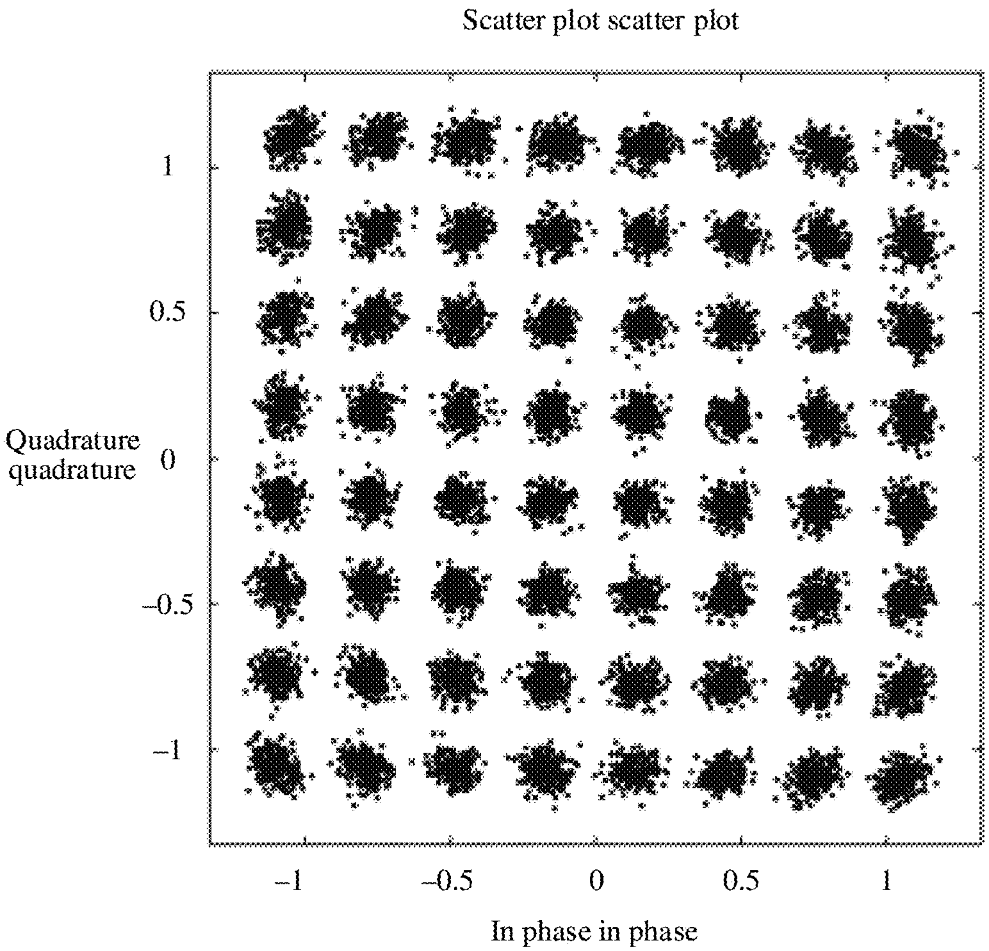
FIG. 1*c* is a schematic diagram of impact of phase noise on a received signal in frequency domain according to at least one embodiment.

(3) Phase noise (phase noise) refers to random change that is of a phase of a signal output by a system (for example, various radio frequency devices) and that is caused in the system under action of various types of noise. The phase noise is a fluctuation that is in the phase of the signal and that occurs in a short time. In this case, the phase noise randomly changes a phase of a received signal in time domain. Therefore, the phase noise interrupts receiving of the signal. The phase noise randomly occurs. However, the phase noise shows a specific correlation between adjacent time samples, resulting in a common phase error (common phase error, CPE) and inter-subcarrier interference (inter-subcarrier interference, ICI) in frequency domain. After a power spectral density of the phase noise (the phase noise is subsequently briefly referred to as phase noise) reaches a specific level, in response to a modulation order being high, in addition to the common phase error CPE, the inter-subcarrier interference (inter-subcarrier interference, ICI) caused due to the phase noise cannot be ignored. FIG. 1*a*, FIG. 1*b*, and FIG. 1*c* show impact of different phase noise on a received signal in frequency domain. FIG. 1*a* shows impact of no phase noise, FIG. 1*b* shows impact of weak phase noise, and FIG. 1*c* shows impact of strong phase noise. As a frequency band increases, a higher power spectral density of the phase noise indicates greater impact on the received signal.

Phase noise on an orthogonal frequency division multiplexing (orthogonal frequency division multiplexing, OFDM) time-domain signal is $\theta_n$, where n=0, . . . , and $N_c-1$, and $N_c$ is an OFDM inverse fast Fourier transform (inverse fast Fourier transform, IFFT) length, namely, a quantity of subcarriers.

Discrete Fourier transform (discrete Fourier transform, DFT) and/or fast Fourier transform (fast Fourier transform, FFT) of a point $N_c$ are/is performed on $\theta_n$, to obtain a frequency-domain response $E_n$ of $\theta_n$, where n=0, . . . , and $N_c-1$. Therefore, impact of the phase noise on an OFDM frequency-domain signal (each subcarrier) is expressed as $$R_i = \sum_{j=0}^{N_c-1} S_j * E_{(i-j)_{N_c}}.$$

Herein, $R_i$ is a received signal on an $i^{th}$ subcarrier, $S_i$ is a transmitted signal on the $i^{th}$ subcarrier, $(k)_{N_c}=\text{mod}(k, N_c)$, mod is a remainder operation, k refers to i−j in the foregoing formula, $E_0$ is referred to as a common phase error CPE, and another coefficient E (for example, E1 and E2) is referred to as an inter-subcarrier interference coefficient. The another coefficient E causes interference, namely, inter-subcarrier interference ICI, of a signal on another subcarrier to the received signal on the $i^{th}$ subcarrier. In at least one embodiment, the common phase error CPE and the inter-subcarrier interference ICI are collectively referred to as a phase noise ICI coefficient.

For ease of understanding the technical solutions in at least one embodiment, the following briefly describes a system architecture provided in at least one embodiment. The system architecture described in at least one embodiment is intended to describe the technical solutions in at least one embodiment more clearly, and does not constitute any limitation on the technical solutions provided in at least one embodiment.

The technical solutions in at least one embodiment are applied to various communication systems, for example, a satellite communication system and a conventional mobile communication system. The satellite communication system is integrated with the conventional mobile communication system (namely, a terrestrial communication system). The communication system is, for example, a wireless local area network (wireless local area network, WLAN) communication system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th generation, 5G) system or a new radio (new radio, NR) system, a 6th generation (6th generation, 6G) system, a future communication system, and the like.

Figure 2A:
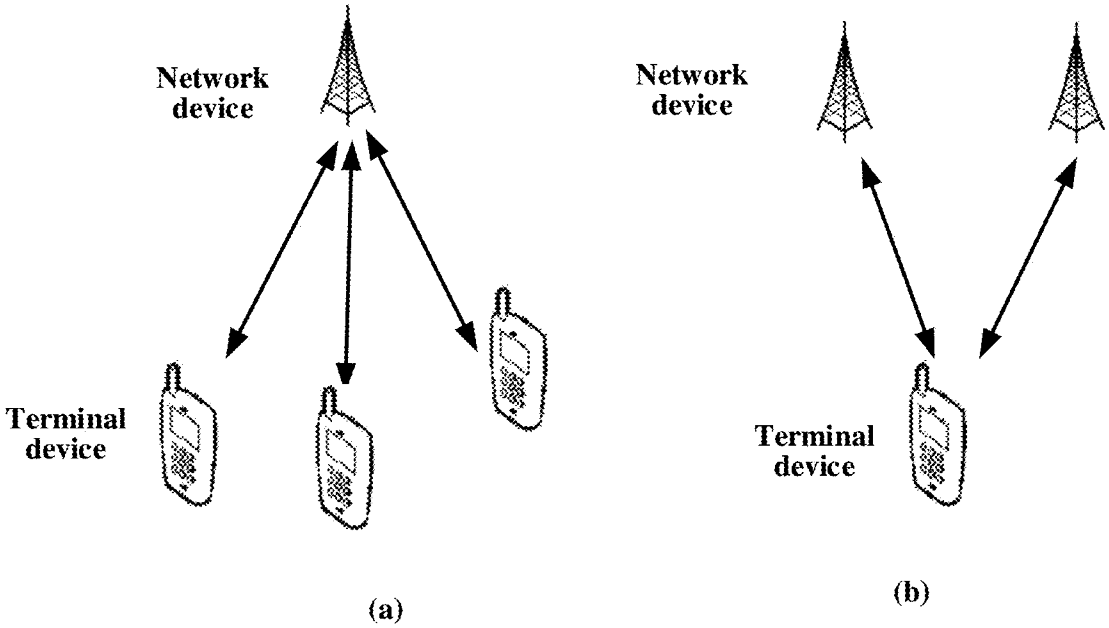
FIG. 2*a* is a schematic diagram of a communication system according to at least one embodiment.

A communication system shown in FIG. 2*a* includes a network device and a terminal device, for example, includes one or more network devices and one or more terminal devices. A single network device transmits data or control signaling to one or more terminal devices (for example, (a)), and a plurality of network devices simultaneously transmits data or control signaling to a single terminal device (for example, (b)).

Figure 2B:
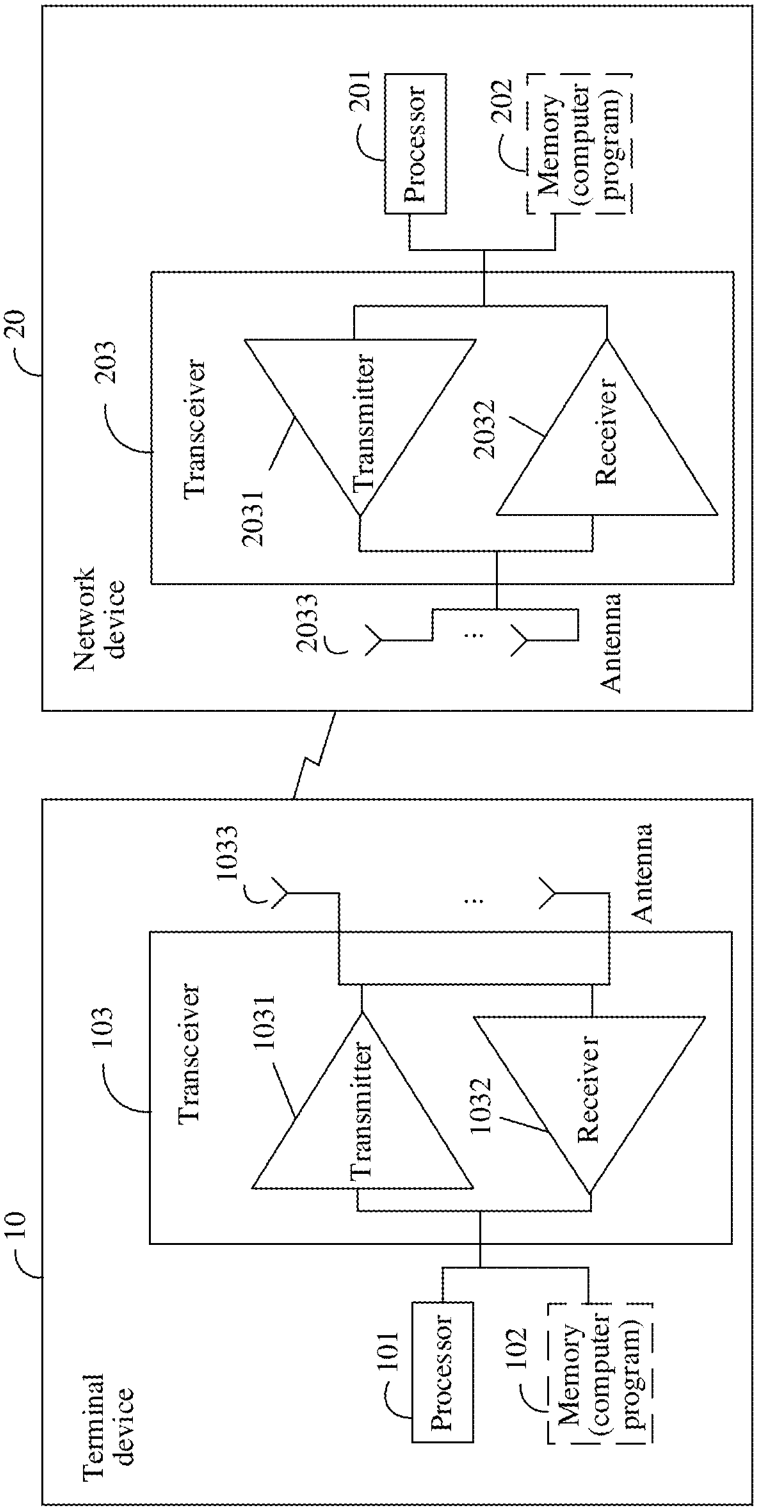
FIG. 2*b* is a schematic diagram of a communication system according to at least one embodiment.

Communication between each network device and each terminal device in the communication system is alternatively represented in another form. As shown in FIG. 2*b*, a terminal device 10 includes at least one processor 101 and at least one transceiver 103, and optionally, further includes at least one memory 102. The memory 102 exists independently, or the memory 102 and the processor 101 is integrated, for example, integrated into a chip. The memory 102 stores program code for executing the technical solutions in at least one embodiment, and the processor 101 controls execution. Various types of computer program code to be executed is considered as drivers of the processor 101. For example, the processor 101 is configured to execute the computer program code stored in the memory 102, to implement the technical solutions in at least one embodiment. The transceiver 103 includes a transmitter 1031, a receiver 1032, and an antenna 1033. The receiver 1032 is configured to receive data or control signaling from a network device 20 through the antenna 1033, and the transmitter 1031 is configured to send information to the network device 20 through the antenna 1033.

The network device 20 includes at least one processor 201 and at least one transceiver 203, and optionally, further includes at least one memory 202. The memory 202 exists independently, or the memory 202 and the processor 201 is integrated, for example, integrated into a chip. The memory 202 stores program code for executing the technical solutions in at least one embodiment, and the processor 201 controls execution. Various types of computer program code to be executed is considered as drivers of the processor 201. For example, the processor 201 is configured to execute the computer program code stored in the memory 202, to implement the technical solutions in at least one embodiment. The transceiver 203 includes a transmitter 2031, a receiver 2032, and an antenna 2033. The transmitter 2031 is configured to send data or control signaling to the terminal device 10 through the antenna 2033, and the receiver 2032 is configured to receive information from the terminal device 10 through the antenna 2033.

For ease of understanding at least one embodiment, the following describes an application scenario of at least one embodiment. The network architecture and the service scenario described in at least one embodiment are intended to describe the technical solutions in at least one embodiment more clearly, and do not constitute any limitation on the technical solutions provided in at least one embodiment. Persons of ordinary skill in the art know that as a new service scenario emerges, the technical solutions provided in at least one embodiment are also applicable to a similar technical problem.

In response to wireless communication being performed between a network device and a terminal device, to reduce or eliminate impact of phase noise on data demodulation performance, the terminal device sends a reference signal, for example, a phase tracking reference signal (phase tracking reference signal, PTRS), known to the network device to the network device. The network device estimates phase noise based on the PTRS, and then perform corresponding phase compensation, to improve data demodulation performance A higher density of the PTRS in time domain indicates higher accuracy of estimating the phase noise.

Figure 3:
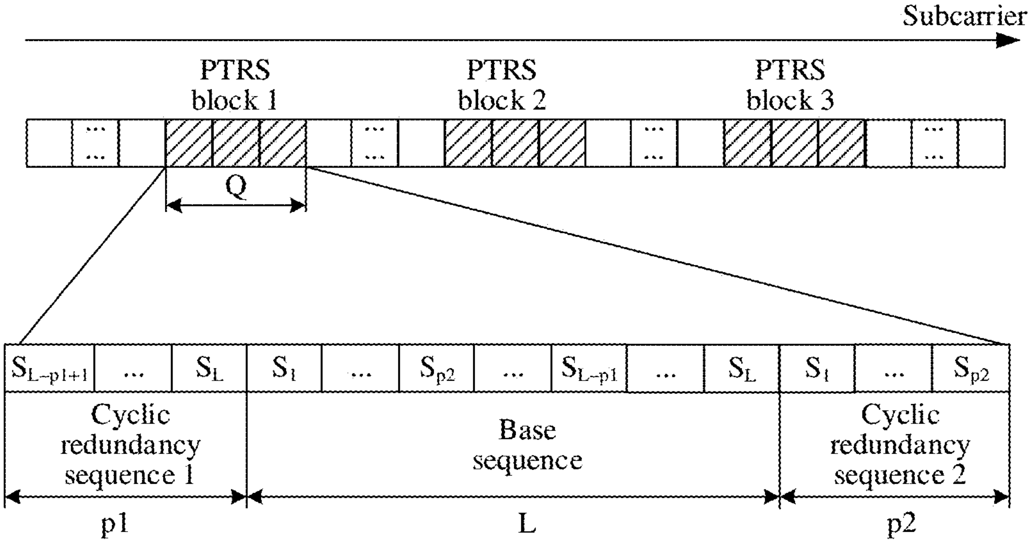
FIG. 3 is a schematic diagram of transmitting a PTRS on a subcarrier according to at least one embodiment.

As shown in FIG. 3, a schematic diagram of transmitting a PTRS on a subcarrier is provided. A plurality of consecutive subcarriers used to transmit the PTRS are referred to as a PTRS subcarrier block, for example, a PTRS block 1, a PTRS block 2, and a PTRS block 3 in FIG. 3.

One PTRS includes a cyclic redundancy sequence 1 (circular sequence part 1) with a length of p1, a base sequence (base sequence) with a length of L, and a cyclic redundancy sequence 2 (circular sequence part 2) with a length of p2 that are sequentially arranged.

Correspondingly, one PTRS subcarrier block includes a first subcarrier with a length of p1 (the first subcarrier is used to transmit the cyclic redundancy sequence 1), a second subcarrier with a length of L (the second subcarrier is used to transmit the base sequence), and a third subcarrier with a length of p2 (the third subcarrier is used to transmit the cyclic redundancy sequence 2) that are sequentially arranged.

A length of the PTRS is Q, that is, the PTRS includes Q signals. The PTRS subcarrier block includes Q subcarriers, and one signal is transmitted on each subcarrier. Q=L+p1+p2.

L signals in the base sequence are signals $S_1$ to $S_L$; p1 signals in the cyclic redundancy sequence 1 before the base sequence are $S_{L-p1+1}$ to $S_L$; and p2 signals in the cyclic redundancy sequence 2 after the base sequence are $S_1$ to $S_{p2}$.

An example in which p1=p2=2 is used. In this case, the following expression is obtained for received signals on subcarriers on which the signals $S_1$-$S_L$ are located:

$$\begin{bmatrix} r_1 \\ r_2 \\ r_3 \\ \ldots \end{bmatrix} = \begin{bmatrix} S_{L-1} & S_L & S_1 & S_2 & S_3 \\ S_L & S_1 & S_2 & S_3 & S_4 \\ S_1 & S_2 & S_3 & S_4 & S_5 \\ \ldots & \ldots & \ldots & \ldots & \ldots \\ S_{L-4} & S_{L-3} & S_{L-2} & S_{L-1} & S_L \\ S_{L-3} & S_{L-2} & S_{L-1} & S_L & S_1 \\ S_{L-2} & S_{L-1} & S_L & S_1 & S_2 \end{bmatrix} \begin{bmatrix} E_{-2} \\ E_{-1} \\ E_0 \\ E_1 \\ E_2 \end{bmatrix} + \text{Noise} + \text{Residual } ICI$$

Herein, $E_{-n}=E_{-n+N_c}$, and the residual ICI is ICI caused by E other than $E_{-2}$, $E_{-1}$, $E_0$, $E_1$, and $E_2$.

In response to the base sequence is a ZC (Zadoff-Chu) sequence, because of a characteristic of orthogonality of the ZC sequence, each column of an S matrix is orthogonal because of a function of the added cyclic redundancy sequence. Therefore, performance of estimating $E_{-2}$, $E_{-1}$, $E_0$, $E_1$, and $E_2$ from the received signals r is good.

In response to a plurality of PTRSs are transmitted on subcarriers, cyclic redundancy characteristics of all PTRS subcarrier blocks are the same and are independent. That is, signals at corresponding locations in the PTRS block 1, the PTRS block 2, and the PTRS block 3 in FIG. 3 are the same. Although all the plurality of PTRS subcarrier blocks have a cyclic redundancy characteristic, the cyclic redundancy characteristic is actually formed only in one PTRS subcarrier block. The length L of the base sequence is short, and therefore performance of estimating $E_{-2}$, $E_{-1}$, $E_0$, $E_1$, and $E_2$ (inter-subcarrier interference ICI coefficients) is limited.

Based on this, at least one embodiment provides a solution for forming a cyclic redundancy characteristic in a plurality of reference signal (for example, PTRS) subcarrier blocks. In at least one embodiment, a base sequence transmitted on a plurality of reference signal subcarrier blocks and a corresponding cyclic redundancy sending solution are jointly designed. The sequence has a long length, to improve precision of estimating an inter-subcarrier interference ICI coefficient generated due to phase noise, so as to improve data demodulation performance.

The following describes the solution in detail with reference to the accompanying drawings. Features or content denoted by dashed lines in the accompanying drawings is understood as optional operations or optional structures in at least one embodiment.

Figure 4A:
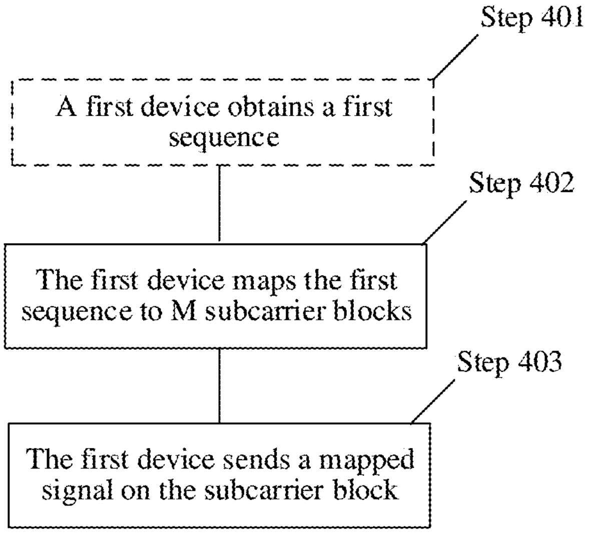
FIG. 4*a* is a schematic diagram of a process of a signal transmission method according to at least one embodiment.

As shown in FIG. 4*a*, a schematic diagram of a process of a signal sending method is provided. The following steps are included.

Step 401: A first device obtains a first sequence.

The first device is a terminal device, or is a network device.

The first device independently generates the first sequence, or obtains the first sequence from another device.

A length of the first sequence is N, that is, the first sequence includes N signals. The first sequence is used to generate a reference signal. For example, the reference signal is a reference signal used for phase tracking, or the reference signal is a reference signal used to estimate phase noise. The reference signal includes but is not limited to a PTRS.

In an example a, the first sequence is a ZC (Zadoff-Chu) sequence.

In an example a1, the ZC sequence meets the following formula:

$S_n=\exp(-j*\pi*u*(n+a)*(n+b)/N)$, where $S_n$ is the first sequence.

Herein, exp is an exponential function with a natural constant e as a base in higher mathematics, n=0, 1, . . . , and N−1, u, a, and b are integers, u, a, and b is configured by a network device for a terminal device, or is calculated by a terminal device based on parameters such as a cell ID, a terminal device ID, a number of a subframe in which a PTRS is located, and a symbol in which the PTRS is located, and j is a complex number symbol, that is, $j=\sqrt{(-1)}$.

In an optional example, a greatest common multiple of u and N is constrained to 1, that is, u and N are mutually prime.

In an optional example, the length N of the first sequence is constrained to a prime number. For example, N=7, 11, 13, 17, 19, 23, 29, 31, 37, 41, or 43.

Characteristic root amplitudes of the matrix $S_n$ are the same, and an inter-subcarrier interference ICI coefficient E generated due to phase noise is better estimated.

In a first example a2, the first sequence is obtained by truncating a ZC (Zadoff-Chu) root sequence. This is a case in which the first sequence belongs to a ZC sequence. A ZC sequence generated by constraining the length N of the first sequence to a prime number is referred to as a root sequence. In some cases, a sequence length used by a system is not a prime number, but another integer. For example, a length of an actually used sequence needs to be the same as a length of a resource configuration, and for a low PAPR sequence used for channel estimation, a sequence length needs to be equal to a multiple of 12 (a length of one transmission resource block (Resource Block) defined in a protocol in 5G/4G is 12). Therefore, the generated prime number root sequence is usually truncated to obtain a desired sequence length.

A truncation method is as follows: [1:K] root sequences with a length of N are captured, [N−K+1:N] root sequences with a length of N are captured, or [A:A+K−1] root sequences with a length of N are captured. Herein, A is a positive integer, and A+K−1≤N.

For example, a ZC sequence with a length of 48 is actually used. In this case, a root sequence whose length is closest to 48 is generated, for example, $S_n=\exp(-j*\pi*u*(n+a)*(n+b)/N)$, where N=53.

Then, 1:48 is selected, or 48 sequences are selected according to the foregoing rule, to generate the actually used first sequence.

In an example b, the first sequence is a time-domain quadrature amplitude modulation QAM sequence.

The first sequence is defined in time domain. For example, a signal included in the first sequence is a modulation symbol in time domain. For example, the modulation symbol is a standard BPSK signal or a signal obtained after a standard BPSK signal is scaled proportionally, and there are $2^N$ sequence combinations. For another example, the modulation symbol is a pi/2 BPSK signal or a signal obtained after a pi/2 BPSK signal is scaled proportionally, and there are $2^N$ sequence combinations.

For another example, the modulation symbol is a QPSK signal or a signal obtained after a QPSK signal is scaled proportionally, and there are $4^N$ sequence combinations.

In a plurality of sequence combinations, transformation to frequency domain is implemented by performing N-point Fourier transform, and a sequence with a stable frequency-domain amplitude response is selected as a valid sequence for output. The QPSK signal is used as an example. In at least one embodiment, the $4^N$ sequence combinations are separately transformed to frequency domain by performing N-point Fourier transform, and then a sequence with a stable frequency-domain amplitude response is selected as a valid sequence for output.

Then, a valid sequence set is selected from a plurality of valid sequences. For example, in ascending order of amplitude variance values, first P groups are selected as a valid sequence set of a time-domain QPSK sequence, and a larger value of N indicates higher stability of the selected sequence. For example, in response to the sequence length being 8, the selected time-domain valid sequence set includes sequences in FIG. 5*a*, FIG. 5*b*, and FIG. 5*c*, and OFDM subcarrier frequency-domain sequences corresponding to the valid sequence set are sequences obtained after FFT is performed on the sequences in FIG. 5*a*, FIG. 5*b*, and FIG. 5*c*.

Then, a sequence is selected from the valid sequence set as the first sequence. For example, a time-domain QAM sequence selected by the terminal device as the first sequence is configured by the network device for the terminal device, or is calculated by the terminal device based on at least one of parameters such as a cell ID, a terminal device ID, a number of a subframe in which a PTRS is located, and a symbol in which the PTRS is located.

In an example c, the first sequence is alternatively a frequency-domain QAM sequence.

Similar to the time-domain QAM sequence, the first sequence is defined in frequency domain. For example, a signal included in the first sequence is a modulation symbol in frequency domain. For example, the modulation symbol is a standard BPSK signal or a signal obtained after a standard BPSK signal is scaled proportionally, and there are $2^N$ sequence combinations. For another example, the modulation symbol is a pi/2 BPSK signal or a signal obtained after a pi/2 BPSK signal is scaled proportionally, and there are $2^N$ sequence combinations. For another example, the modulation symbol is a QPSK signal or a signal obtained after a QPSK signal is scaled proportionally, and there are $4^N$ sequence combinations.

A frequency-domain QAM sequence selected by the terminal device as the first sequence is configured by the network device for the terminal device, or is calculated by the terminal device based on at least one of parameters such as a cell ID, a terminal device ID, a number of a subframe in which a PTRS is located, and a symbol in which the PTRS is located.

In an example d, the first sequence is a complementary sequence. Two complementary sequences (complementary sequences, which are described in the conventional technology and are not described again) are respectively denoted as S1 and S2, and S1 and S2 have a same length that is N/2. The sequences S1 and S2 are spliced into a new sequence [S1 S2], to form the first sequence with a length of N.

For example, a pair of complementary sequences is as follows:

$$b_A=[1, 1, 1, 1, -1, 1, -1, -1, -1, 1, 1, -1, -1, 1, 1, -1, 1, -1, -1, 1]$$

$$b_B=[1, 1, 1, 1, -1, 1, 1, 1, 1, 1, -1, -1, -1, 1, -1, 1, -1, 1, 1, -1]$$

After DFT modulation is performed, $b_A$ and $b_B$ are added, and are complementary sequences in frequency domain.

For example, after pi/2 BPSK modulation is performed on $b_A$ and $b_B$, the following is obtained:

$$s_1(k) = b_A(k)\exp\left(-\frac{j\pi k}{2} + jC\right)$$

-continued $$s_2(k) = b_B(k)\exp\left(-\frac{j\pi k}{2} + jC\right)$$

Herein, C is a constant, and j is a complex number symbol, that is, $j=\sqrt{(-1)}$.

A complementary sequence selected by the terminal device as the first sequence is configured by the network device for the terminal device, or is calculated by the terminal device based on at least one of parameters such as a cell ID, a terminal device ID, a number of a subframe in which a PTRS is located, and a symbol in which the PTRS is located.

In an example e, the first sequence is a pseudo-random sequence.

QPSK modulation is performed to obtain the first sequence, and the first sequence is shown as follows:

$$S(n) = \frac{1}{\sqrt{2}}(1 - 2\cdot c(2n)) + j\frac{1}{\sqrt{2}}(1 - 2\cdot c(2n+1)),\ \text{where}$$

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

Herein, $N_C=1600$, $x_1(0)=1$, $x_1(n)=0$, n=1, 2, . . . , and 30, $$c_{init} = \sum_{i=0}^{30} x_2(i)\cdot 2^i,$$

and $c_{init}$ is determined based on at least one of parameters such as a cell ID, a terminal device ID, a number of a subframe in which a PTRS is located, and a symbol in which the PTRS is located.

The foregoing sequences are merely examples, and the first sequence is alternatively another sequence. The first sequence in at least one embodiment includes but is not limited to the sequences listed above.

Different first sequences is applied to different application scenarios because of different characteristics of the first sequences.

For example, cyclic shifts of the ZC sequence are orthogonal. Therefore, each column of the S matrix is orthogonal, and an inter-subcarrier interference ICI coefficient generated due to phase noise is better estimated.

For example, the time-domain/frequency-domain QAM sequence is easy to implement, and shares a signal modulation generator with data QAM modulation.

For example, the pseudo-random sequence is the same as a sequence generation method in an existing cellular communication system, and shares a generator.

For example, the complementary sequence is easy to implement.

Step 402: The first device maps the first sequence to M subcarrier blocks used to transmit a reference signal.

For example, in response to the first sequence being mapped to M consecutive subcarrier blocks used to transmit a reference signal, a subcarrier block used to transmit data is included between adjacent subcarrier blocks used to transmit a reference signal. Herein, M is an integer greater than or equal to 2.

For ease of description, a "subcarrier block used to transmit a reference signal" is subsequently briefly referred to as a "subcarrier block", and a "subcarrier used to transmit a reference signal" is subsequently briefly referred to as a "subcarrier".

For example, an $m^{th}$ subcarrier block includes $Q_m$ subcarriers, where $Q_m$ is an integer greater than 2, and m is sequentially all of positive integers from 1 to M. Quantities of subcarriers included in different subcarrier blocks is the same or is different. Optionally, a difference between the quantities of subcarriers included in different subcarrier blocks is less than or equal to 1. For example, a difference between $Q_m$ and $Q_{m+1}$ is less than or equal to 1. For another example, a difference between $Q_m$ and $Q_{m+2}$ is less than or equal to 1.

The length N of the first sequence is greater than a quantity of subcarriers included in any subcarrier block, and N is less than a sum of quantities of subcarriers included in the M subcarrier blocks. That is, N is greater than $Q_m$, and N is less than a sum of $Q_1$, $Q_2$, . . . , $Q_{m-1}$, and $Q_m$.

In response to each signal in the first sequence being mapped to one subcarrier, for any subcarrier block, a plurality of signals mapped to the subcarrier block are different.

In an example, a plurality of (for example, Q) consecutive signals in the first sequence is mapped to one subcarrier block (for example, the $Q_m$ subcarriers). Specifically, a plurality of (for example, Q) cyclically consecutive signals in the first sequence is mapped to one subcarrier block (for example, the $Q_m$ subcarriers). "Cyclically consecutive" is understood as that after a last signal in the first sequence is mapped to a subcarrier a, a first signal in the first sequence is mapped to a next subcarrier of the subcarrier a (in this manner, mapping is performed in ascending order of subcarrier indexes and ascending order of signal indexes); or after a first signal in the first sequence is mapped to a subcarrier a, a last signal in the first sequence is mapped to a next subcarrier of the subcarrier a (in this manner, mapping is performed in ascending order of subcarrier indexes and descending order of signal indexes).

In response to the first sequence being mapped to the M (for example, M consecutive) subcarrier blocks, details are as follows:

In an example, the first sequence is mapped to the M (for example, M consecutive) subcarrier blocks in ascending order of subcarrier indexes and ascending order of signal indexes.

In another example, the first sequence is mapped to the M (for example, M consecutive) subcarrier blocks in ascending order of subcarrier indexes and descending order of signal indexes.

In an example, a plurality of (for example, i) signals mapped to a plurality of (for example, i) consecutive subcarriers at a rear location in the $m^{th}$ subcarrier block are the same as a plurality of (for example, i) signals mapped to a plurality of (for example, i) consecutive subcarriers at a front location in an $(m+1)^{th}$ subcarrier block, where m is any integer from 1 to M−1, and i is an integer greater than or equal to 1.

For example, the first sequence includes 15 (N=15) signals: signals 0 to 14, a quantity of subcarrier blocks is M=3, and each subcarrier block includes nine subcarriers. For example, three signals mapped to three subcarriers at a rear location in a previous ($m^{th}$) subcarrier block are the same as three signals mapped to three subcarriers at a front location in a current ($(m+1)^{th}$) subcarrier block, that is, i=3. An example is as follows:

- Indexes, in the first sequence, of nine signals mapped to a subcarrier block 1 are respectively 13, 14, 0, 1, 2, 3, 4, 5, and 6;
- indexes, in the first sequence, of nine signals mapped to a subcarrier block 2 are respectively 4, 5, 6, 7, 8, 9, 10, 11, and 12; and
- indexes, in the first sequence, of nine signals mapped to a subcarrier block 3 are respectively 10, 11, 12, 13, 14, 0, 1, 2, and 3.

In another example, a plurality of (for example, i) signals mapped to a plurality of (for example, i) consecutive subcarriers at a rear location in the $m^{th}$ subcarrier block are the same as a plurality of (for example, i) signals mapped to a plurality of (for example, i) consecutive subcarriers at a front location in an $(m+1)^{th}$ subcarrier block, and a plurality of (for example, i) signals mapped to a plurality of (for example, i) consecutive subcarriers at a rear location in an $M^{th}$ (last) subcarrier block are the same as a plurality of (for example, i) signals mapped to a plurality of (for example, i) consecutive subcarriers at a front location in a first subcarrier block. This is alternatively understood as that a plurality of signals mapped to a plurality of consecutive subcarriers at a rear location in the $m^{th}$ subcarrier block are the same as a plurality of signals mapped to a plurality of consecutive subcarriers at a front location in a $(\mathrm{mod}(m, M)+1)^{th}$ subcarrier block, where mod(m, M) is a remainder obtained by dividing m by M.

Figure 6:
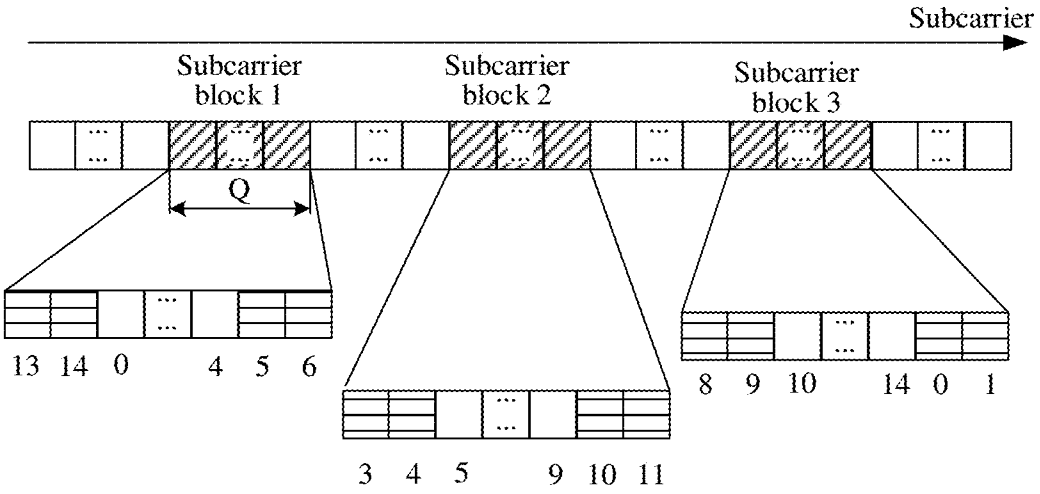
FIG. 6 is a schematic diagram of signal mapping according to at least one embodiment.

As shown in FIG. 6, the first sequence includes 15 (N=15) signals: signals 0 to 14, a quantity of subcarrier blocks is M=3, and each subcarrier block includes nine subcarriers. For example, four signals mapped to four subcarriers at a rear location in a previous ($m^{th}$) subcarrier block are the same as four signals mapped to four subcarriers at a front location in a current ($(\mathrm{mod}(m, M)+1)^{th}$) subcarrier block, that is, i=4. An example is as follows:

- Indexes, in the first sequence, of nine signals mapped to a subcarrier block 1 are respectively 13, 14, 0, 1, 2, 3, 4, 5, and 6;
- indexes, in the first sequence, of nine signals mapped to a subcarrier block 2 are respectively 3, 4, 5, 6, 7, 8, 9, 10, and 11; and
- indexes, in the first sequence, of nine signals mapped to a subcarrier block 3 are respectively 8, 9, 10, 11, 12, 13, 14, 0, and 1.

In an example, the $m^{th}$ subcarrier block sequentially includes a first subcarrier with a length of $p1_m$ (the first subcarrier is used to transmit a cyclic redundancy sequence 1), a second subcarrier with a length of $L_m$ (the second subcarrier is used to transmit a base sequence), and a third subcarrier with a length of $p2_m$ (the third subcarrier is used to transmit a cyclic redundancy sequence 2). For example, the first subcarrier is used to transmit a cyclic redundancy sequence 1 in the PTRS, the second subcarrier is used to transmit a base sequence in the PTRS, and the third subcarrier is used to transmit a cyclic redundancy sequence 2 in the PTRS. The PTRS includes the cyclic redundancy sequence 1 with a length of p1, the base sequence with a length of L, and the cyclic redundancy sequence 2 with a length of p2 that are sequentially arranged. The cyclic redundancy sequence and the base sequence herein are merely used for ease of description, and should not constitute a limitation on the solution.

$$Q=L+p1+p2.$$

In an optional example, lengths L of second subcarriers in different subcarrier blocks (the lengths L of the second subcarriers in the subcarrier blocks is alternatively understood as lengths L of base sequences in PTRSs) is constrained to be as equal as possible. For example, in response to N being exactly divided by M, $L_m$=N/M. For another example, in response to N not being able to exactly be divided by M, $L_m$=floor(N/M), $L_m$=floor(N/M)+1, $L_m$=ceil (N/M), $L_m$=ceil(N/M)−1, or $L_m$ is an integer obtained by rounding off N/M, where floor is rounding down, ceil is rounding up, and a value of m is some or all of the integers from 1 to M. That is, in the M subcarrier blocks, lengths of second subcarriers in all of the subcarrier blocks meet the formula, or lengths of second subcarriers in some of the subcarrier blocks meet the formula.

Optionally, a difference between lengths L of second subcarriers in different subcarrier blocks is constrained to be less than or equal to 1. The lengths L of the second subcarriers in the different subcarrier blocks are the same as much as possible. In response to lengths of second subcarriers in all of the subcarrier blocks being the same, a good cyclic characteristic is achieved, and demodulation performance is further improved.

In an optional example, a sum of lengths of second subcarriers respectively included in the M subcarrier blocks is the length of the first sequence. That is, $L_1+L_2+ \ldots +L_{M-1}+L_M=N$.

In an example, lengths Q of different subcarrier blocks is constrained to be as equal as possible. For example, a value of the length p1 of the first subcarrier and/or a value of the length p2 of the third subcarrier in the subcarrier block is adjusted, so that lengths Q of all of the subcarrier blocks are equal.

In an example, in any subcarrier block, a difference between p1 and p2 is less than or equal to 1, that is, abs($\mathbf{p1}_m-\mathbf{p2}_m$)<1, and the value of m is some or all of the integers from 1 to M. That is, in the M subcarrier blocks, a difference between lengths of first subcarriers and lengths of third subcarriers in all or some of the subcarrier blocks is less than or equal to 1. Redundancy on two sides of a subcarrier block is as equal as possible, to improve phase noise estimation performance and further improve demodulation performance.

In different subcarrier blocks, lengths p1 are as equal as possible, and lengths p2 are as equal as possible.

In an example, in response to the first sequence being mapped to the M subcarrier blocks, the following method is used:

First, the first sequence is sequentially mapped to the second subcarriers in the M subcarrier blocks, and signals mapped to the second subcarriers in the M subcarrier blocks are consecutive in the first sequence.

The first sequence with a length of N is divided into M subsequences, a length of an $m^{th}$ subsequence is $L_m$, the M subsequences are respectively mapped to the second subcarriers in the M subcarrier blocks, and the $m^{th}$ subsequence is mapped to the second subcarrier in the $m^{th}$ subcarrier block.

In response to the first sequence being sequentially mapped to the second subcarriers in the M subcarrier blocks, for example, the first sequence is mapped to the second subcarriers in the M (consecutive) subcarrier blocks in ascending order of subcarrier indexes and ascending order of signal indexes; or the first sequence is mapped to the second subcarriers in the M (consecutive) subcarrier blocks in ascending order of subcarrier indexes and descending order of signal indexes.

Then, signals in the first sequence are mapped to first subcarriers and third subcarriers in the M subcarrier blocks in a manner in which signals mapped to each subcarrier block are cyclically consecutive. "Cyclically consecutive" is understood as that in response to a signal mapped to a subcarrier a being a last signal in the first sequence, a first signal in the subcarrier is mapped to a next subcarrier of the subcarrier a (in this manner, mapping is performed in ascending order of subcarrier indexes and ascending order of signal indexes); or in response to a signal mapped to a subcarrier a being a first signal in the first sequence, a last signal in the subcarriers is mapped to a next subcarrier of the subcarrier a (in this manner, mapping is performed in ascending order of subcarrier indexes and descending order of signal indexes).

For any subcarrier block, a signal mapped to a first subcarrier in a second subcarrier is a $z^{th}$ signal (which is referred to as a signal $S_1$) in the first sequence, and a signal mapped to a last subcarrier in the second subcarrier is an $x^{th}$ signal (which is referred to as a signal $S_L$) in the first sequence.

In an example, in response to the first sequence being mapped to the second subcarriers in the M (consecutive) subcarrier blocks in ascending order of subcarrier indexes and ascending order of signal indexes, z is less than x.

For the any subcarrier block, a signal mapped to a $j^{th}$ subcarrier before the first subcarrier in the second subcarrier (which is alternatively understood as a $j^{th}$ signal before the signal $S_1$ after mapping) is a $(z-j)^{th}$ signal in the first sequence, and in response to z−j being less than or equal to 0, z−j is replaced with z−j+N; and a signal mapped to a $j^{th}$ subcarrier after the last subcarrier in the second subcarrier (which is alternatively understood as a $j^{th}$ signal after the signal $S_L$ after mapping) is an $(x+j)^{th}$ signal in the first sequence, and in response to x+j being greater than N, x+j is replaced with x+j−N.

As shown in FIG. 6, the first sequence includes 15 (N=15) signals: signals 0 to 14, a quantity of subcarrier blocks is M=3, a length of each subcarrier block is Q=9, the length of the second subcarrier (base sequence) is L=5, the length of the first subcarrier (cyclic redundancy sequence 1) is p1=2, and the length of the third subcarrier (cyclic redundancy sequence 2) is p2=2.

The 15 signals are divided into three parts. A first part is a signal 0 to a signal 4, a second part is a signal 5 to a signal 9, and a third part is a signal 10 to a signal 14. The three parts are mapped to second subcarriers in the three subcarrier blocks in ascending order of subcarrier indexes and ascending order of signal indexes.

Five signals mapped to a second subcarrier in a subcarrier block 1 are respectively a first signal to a fifth signal in the first sequence, namely, the signal 0 to the signal 4. Five signals mapped to a second subcarrier in a subcarrier block 2 are respectively a sixth signal to a tenth signal in the first sequence, namely, the signal 5 to the signal 9. Five signals mapped to a second subcarrier in a subcarrier block 3 are respectively an eleventh signal to a fifteenth signal in the first sequence, namely, the signal 10 to the signal 14.

The subcarrier block 1 is used as an example for description.

A signal mapped to a first subcarrier in the second subcarrier in the subcarrier block 1 is the first (z=1) signal, namely, the signal 0, in the first sequence.

A signal mapped to a first (j=1) subcarrier before the first subcarrier is the fifteenth (z−j+N=1−1+15=15) signal, namely, the signal 14, in the first sequence.

A signal mapped to a second (j=2) subcarrier before the first subcarrier is a fourteenth (z−j+N=1−2+15=14) signal, namely, a signal 13, in the first sequence.

A signal mapped to a last subcarrier in the second subcarrier in the subcarrier block 1 is the fifth (x=5) signal, namely, the signal 4, in the first sequence.

A signal mapped to a first (j=1) subcarrier after the last subcarrier is the sixth (x+j=5+1=6) signal, namely, the signal 5, in the first sequence.

A signal mapped to a second (j=2) subcarrier after the last subcarrier is a seventh (x+j=5+2=7) signal, namely, a signal 6, in the first sequence.

The subcarrier block 2 is used as an example for description.

A signal mapped to a first subcarrier in the second subcarrier in the subcarrier block 2 is the sixth (z=6) signal, namely, the signal 5, in the first sequence.

A signal mapped to a first (j=1) subcarrier before the first subcarrier is the fifth (z–j=6–1=5) signal, namely, the signal 4, in the first sequence.

A signal mapped to a second (j=2) subcarrier before the first subcarrier is a fourth (z–j=6–2=4) signal, namely, a signal 3, in the first sequence.

A signal mapped to a last subcarrier in the second subcarrier in the subcarrier block 2 is the tenth (x=10) signal, namely, the signal 9, in the first sequence.

A signal mapped to a first (j=1) subcarrier after the last subcarrier is the eleventh (x+j=10+1=11) signal, namely, the signal 10, in the first sequence.

A signal mapped to a second (j=2) subcarrier after the last subcarrier is a twelfth (x+j=10+2=12) signal, namely, a signal 11, in the first sequence.

The subcarrier block 3 is used as an example for description.

A signal mapped to a first subcarrier in the second subcarrier in the subcarrier block 3 is the eleventh (z=11) signal, namely, the signal 10, in the first sequence.

A signal mapped to a first (j=1) subcarrier before the first subcarrier is the tenth (z–j=11–1=10) signal, namely, the signal 9, in the first sequence.

A signal mapped to a second (j=2) subcarrier before the first subcarrier is a ninth (z–j=11–2=8) signal, namely, a signal 8, in the first sequence.

A signal mapped to a last subcarrier in the second subcarrier in the subcarrier block 2 is the fifteenth (x=15) signal, namely, the signal 14, in the first sequence.

A signal mapped to a first (j=1) subcarrier after the last subcarrier is the first (x+j–N=15+1–15=1) signal, namely, the signal 0, in the first sequence.

A signal mapped to a second (j=2) subcarrier after the last subcarrier is a second (x+j–N=10+2–15=2) signal, namely, a signal 1, in the first sequence.

In another example, in response to the first sequence being mapped to the second subcarriers in the M (consecutive) subcarrier blocks in ascending order of subcarrier indexes and descending order of signal indexes, z is greater than x.

For the any subcarrier block, a signal mapped to a $j^{th}$ subcarrier before the first subcarrier in the second subcarrier (which is alternatively understood as a $j^{th}$ signal before the signal $S_1$ after mapping) is a $(z+j)^{th}$ signal in the first sequence, and in response to z+j being greater than N, z+j is replaced with z+j–N; and a signal mapped to a $j^{th}$ subcarrier after the last subcarrier in the second subcarrier (which is alternatively understood as a $j^{th}$ signal after the signal $S_L$ after mapping) is an $(x-j)^{th}$ signal in the first sequence, and in response to z–j being less than or equal to 0, x–j is replaced with x–j+N.

In an optional example, impact of the phase noise on a received signal on each subcarrier is described above. A received signal on a subcarrier for transmitting the base sequence meets the following formula:

$$\begin{bmatrix} r_0 \\ \cdots \\ r_{14} \end{bmatrix} = \begin{bmatrix} S_{13} & S_{14} & S_0 & S_1 & S_2 \\ S_{14} & S_0 & S_1 & S_2 & S_3 \\ S_0 & S_1 & S_2 & S_3 & S_4 \\ & & \cdots & & \\ S_{10} & S_{11} & S_{12} & S_{13} & S_{14} \\ S_{11} & S_{12} & S_{13} & S_{14} & S_0 \\ S_{12} & S_{13} & S_{14} & S_0 & S_1 \end{bmatrix} \begin{bmatrix} E_{-2} \\ E_{-1} \\ E_0 \\ E_1 \\ E_2 \end{bmatrix} + \text{Noise} + \text{Residual } ICI$$

Herein, Noise is noise, and the S matrix is a matrix including cyclic shifts of the base sequence (second subcarrier).

Herein, $E_{-n}=E_{-n+N}$, and the residual ICI is ICI caused by E other than $E_{-2}$, $E_{-1}$, $E_0$, $E_1$, and $E_2$.

From the received signals r, $E_{-2}$, $E_{-1}$, $E_0$, $E_1$, and $E_2$ is estimated.

For signals on any subcarriers, for example, S13, S14, or S2, ICI coefficients at locations of these signals are the same.

For example, in the first row of the formula, for a received signal $r_0$, a sent signal corresponding to a same location at a transmit end is $S_0$, but $r_0$ is affected by five signals, a previous signal is $S_{14}$, and a next signal is $S_1$.

Herein, $r_0=S_{13}*E_{-2}+S_{14}*E_{-1}+S_0*E_0+S_1*E_1+S_2*E_2$.

For example, in the second row of the formula, a sent signal corresponding to $r_1$ is $S_1$, and $r_1=S_{14}*E_{-2}+S_0*E_{-1}+S_1*E_0+S_2*E_1+S_3*E_2$.

Therefore, based on the formula, one received signal r is equal to a product sum of a first vector and an [E_(location relationship)] vector. The first vector is a vector including one or more sent signals at a location before a location of the received signal, a sent signal at the location of the received signal, and one or more signals at a location after the location of the received signal.

In an optional example, a length $Q_m$ of the $m^{th}$ subcarrier block is an integer quantity of RBs. For example, a quantity of subcarriers in the RB is q, and a quantity Q of subcarriers in one subcarrier block is an integer multiple of the quantity q. For example, Qm=αq, where α=1, 2, 3, . . . . Typically, q=12, a value of Q is 12, 24, 36, 48, or the like, and m is some or all of the integers from 1 to M. During resource scheduling, scheduling is usually performed based on a resource block. In at least one embodiment, the value of Q is an integer multiple of the quantity of subcarriers in one resource block RB, and scheduling is easy to perform.

In an optional example, a value of $Q_m$ is determined by using a value of p1$_m$ or p2$_m$, which is alternatively understood as that the value of $Q_m$ is determined based on a value of p1$_m$ and/or a value of p2$_m$, and the value of m is some or all of the integers from 1 to M.

For example, in response to p1$_m$=p2$_m$=2, the value of $Q_m$ is 8, 20, 32, and 44; or in response to p1$_m$=p2$_m$=3, the value of $Q_m$ is 6, 18, 30, and 42.

In an optional example, values of p1$_m$ and p2$_m$ are associated with a value of at least one of $Q_m$, M, and N, and the value of m is some or all of the integers from 1 to M.

For example, the values of p1$_m$ and p2$_m$ are associated with a value range of $Q_m$. In response to $Q_m$≤Q1 (for example, Q1=12), p1$_m$=p2$_m$=U0 (for example, U0=2); or in response to $Q_m$>Q1, p1$_m$=p2$_m$=P1 (for example, P1=3).

For example, the values of p1$_m$ and p2$_m$ are associated with a value range of N. In response to N≤N1 (for example, N1=24), p1$_m$=p2$_m$=U0 (for example, U0=2); or in response to N>N1, p1$_m$=p2$_m$=P1 (for example, P1=3).

One or more of the parameters such as p1$_m$, p2$_m$, $Q_m$, M, $L_m$, and N in at least one embodiment is specified in a protocol, or is configured by the network device for the terminal device. In response to configuring a parameter for a terminal device, a network device configures only some parameters, and the terminal device obtains another parameter based on an association characteristic between parameters. The network device does not need to configure all parameters, to reduce overheads. In response to a base station allocating one or two parameters, another parameter is known, to reduce overheads.

The following describes several examples of values of Q, L, p1, and p2 (for ease of description, m is omitted):

In response to Q=12, and L=7, there is p1=3 and p2=2 or p1=2 and p2=3.

In response to Q=24, and L=19, there is p1=3 and p2=2 or p1=2 and p2=3.

In response to Q=24, and L=17, there is p1=3 and p2=4 or p1=4 and p2=3.

In response to Q=36, and L=31, there is p1=3 and p2=2 or p1=2 and p2=3.

In response to Q=36, and L=29, there is p1=3 and p2=4 or p1=4 and p2=3.

In response to Q=48, and L=43, there is p1=3 and p2=2 or p1=2 and p2=3.

In response to Q=48, and L=41, there is p1=3 and p2=4 or p1=4 and p2=3.

In response to Q=48, and L=37, there is p1=5 and p2=6 or p1=6 and p2=5.

In an optional example, step 402 is split into two steps: step 402*a* and step 402*b*.

Step 402*a*: The first device maps the first sequence to M reference signals.

Step 402*b*: The first device maps the M reference signals to M subcarriers used to transmit the reference signals. Specifically, an $m^{th}$ reference signal is mapped to an $m^{th}$ subcarrier used to transmit the reference signal.

In step 402*a*, the mapping the first sequence to the M reference signals is similar to the process, described in step 402, of mapping the first sequence to the M subcarriers used to transmit a reference signal, and "the subcarrier used to transmit a reference signal" in step 402 is replaced with "the reference signal".

For example, the $m^{th}$ reference signal includes $Q_m$ signals, where $Q_m$ is an integer greater than 2, and a value of m ranges from 1 to M. Quantities of signals (lengths of reference signals) included in different reference signals is the same or is different. Optionally, a difference between the quantities of signals included in different reference signals is less than or equal to 1. For example, a difference between $Q_m$ and $Q_{m+1}$ is less than or equal to 1. For another example, a difference between $Q_m$ and $Q_{m+2}$ is less than or equal to 1.

The length N of the first sequence is greater than a quantity of signals included in any reference signal, and N is less than a sum of quantities of signals included in the M reference signals. That is, N is greater than $Q_m$, and N is less than a sum of $Q_1$, $Q_2$, . . . , $Q_{m-1}$, and $Q_m$.

In an example, a plurality of (for example, Q) consecutive signals in the first sequence is mapped to one reference signal. Specifically, a plurality of (for example, Q) cyclically consecutive signals in the first sequence is mapped to one reference signal.

In response to the first sequence being mapped to the M (for example, M consecutive) reference signals, the first sequence is mapped to the M (for example, M consecutive) reference signals in ascending order of location indexes in the reference signals and ascending order of signal indexes in the first sequence; or the first sequence is mapped to the M (for example, M consecutive) reference signals in ascending order of location indexes in the reference signals and descending order of signal indexes in the first sequence.

In an example, after mapping, a plurality of (for example, i) signals at a rear location in the $m^{th}$ reference signal are the same as a plurality of (for example, i) signals at a front location in an $(m+1)^{th}$ reference signal, where a value of m ranges from 1 to M, and i is an integer greater than or equal to 1.

In another example, after mapping, a plurality of (for example, i) signals at a rear location in the $m^{th}$ reference signal are the same as a plurality of (for example, i) signals at a front location in an $(m+1)^{th}$ reference signal, and a plurality of (for example, i) signals at a rear location in an $M^{th}$ (last) reference signal are the same as a plurality of (for example, i) signals at a front location in a first reference signal. This is alternatively understood as that a plurality of signals at a rear location in the $m^{th}$ reference signal are the same as a plurality of signals at a front location in a $(mod(m, M)+1)^{th}$ reference signal, where mod(m, M) is a remainder obtained by dividing m by M.

In an example, the $m^{th}$ reference signal includes a cyclic redundancy sequence 1 with a length of $\mathbf{p1}_m$, a base sequence with a length of $L_m$, and a cyclic redundancy sequence 2 with a length of $\mathbf{p2}_m$ that are sequentially arranged. The cyclic redundancy sequence and the base sequence herein are merely used for ease of description, and should not constitute a limitation on the solution. Q=L+p1+p2.

In an optional example, lengths L of base sequences in different reference signals is constrained to be as equal as possible. For example, in response to N being exactly divided by M, $L_m$=N/M. For another example, in response to N not able to be exactly divided by M, $L_m$=floor(N/M), $L_m$=floor(N/M)+1, $L_m$=ceil(N/M), $L_m$=ceil(N/M)−1, or $L_m$ is an integer obtained by rounding off N/M, where floor is rounding down, and ceil is rounding up. Optionally, a difference between lengths L of base sequences in different reference signals is constrained to be less than or equal to 1.

In an optional example, a sum of lengths of base sequences respectively included in the M reference signals is the length of the first sequence. That is, $L_1+L_2+ \ldots +L_{M-1}+L_M=N$.

In an example, lengths Q of different reference signals is constrained to be as equal as possible. For example, a value of the length p1 of the cyclic redundancy sequence 1 and/or a value of the length p2 of the cyclic redundancy sequence 2 in the reference signal is adjusted, so that lengths Q of all of the reference signals are equal.

In an example, in any reference signal, a difference between p1 and p2 is less than or equal to 1, that is, $abs(\mathbf{p1}_m-\mathbf{p2}_m)\leq 1$. In different reference signals, lengths p1 are as equal as possible, and lengths p2 are as equal as possible.

In an example, in response to the first sequence being mapped to the M reference signals, the following method is used:

First, the first sequence is sequentially mapped to base sequences in the M reference signals, and signals mapped to the base sequences in the M reference signals are consecutive in the first sequence.

The first sequence with a length of N is divided into M subsequences, a length of an $m^{th}$ subsequence is $L_m$, the M subsequences are respectively mapped to the base sequences in the M reference signals, and the $m^{th}$ subsequence is mapped to the base sequence in the $m^{th}$ reference signal.

In response to the first sequence being sequentially mapped to the base sequences in the M reference signals, for example, the first sequence is mapped to the base sequences in the M (consecutive) reference signals in ascending order of location indexes in the base sequences and ascending order of signal indexes in the first sequence; or the first sequence is mapped to the base sequences in the M (consecutive) reference signals in ascending order of location indexes in the base sequences and descending order of signal indexes in the first sequence.

Then, signals in the first sequence are mapped to cyclic redundancy sequences 1 and cyclic redundancy sequences 2 in the M reference signals in a manner in which signals mapped to each reference signal are cyclically consecutive.

For any reference signal, a signal mapped to a first location in a base sequence is a $z^{th}$ signal (which is referred to as a signal $S_1$) in the first sequence, and a signal mapped to a last location in the base sequence is an $x^{th}$ signal (which is referred to as a signal $S_L$) in the first sequence.

In an example, in response to the first sequence being mapped to the base sequences in the M (consecutive) reference signals in ascending order of location indexes in the base sequences and ascending order of signal indexes in the first sequence, z is less than x.

For the any reference signal, a signal mapped to a $j^{th}$ location before the first location in the base sequence (which is alternatively understood as a $j^{th}$ signal before the signal $S_1$ after mapping) is a $(Z-j)^{th}$ signal in the first sequence, and in response to z−j being less than or equal to 0, z−j is replaced with z−j+N; and a signal mapped to a $j^{th}$ location after the last location in the base sequence (which is alternatively understood as a $j^{th}$ signal after the signal $S_L$ after mapping) is an $(x+j)^{th}$ signal in the first sequence, and in response to x+j being greater than N, x+j is replaced with x+j−N.

In another example, in response to the first sequence being mapped to the base sequences in the M (consecutive) reference signals in ascending order of location indexes in the base sequences and descending order of signal indexes in the first sequence, z is greater than x.

For the any reference signal, a signal mapped to a $j^{th}$ location before the first location in the base sequence (which is alternatively understood as a $j^{th}$ signal before the signal $S_1$ after mapping) is a $(z+j)^{th}$ signal in the first sequence, and in response to z+j being greater than N, z+j is replaced with z+j−N; and a signal mapped to a $j^{th}$ location after the last location in the base sequence (which is alternatively understood as a $j^{th}$ signal after the signal $S_L$ after mapping) is an $(x-j)^{th}$ signal in the first sequence, and in response to z−j being less than or equal to 0, x−j is replaced with x−j+N.

Step 403: The first device sends a mapped signal on each subcarrier.

In at least one embodiment, specifically, in response to a device (network element) being changed, a method for generating a reference signal (a method for mapping the first sequence to a subcarrier block) in the terminal device is different from that in the network device.

In at least one embodiment, a solution in which signals transmitted on a plurality of reference signal subcarrier blocks are jointly designed, and a cyclic redundancy characteristic is formed in the plurality of reference signal (for example, PTRS) subcarrier blocks is used. The first sequence has a long length, so that a cyclic shift matrix larger than that in the conventional technology is constructed to estimate an inter-subcarrier interference ICI coefficient generated due to phase noise, to improve precision of estimating the ICI coefficient generated due to the phase noise, so as to improve data demodulation performance.

Figure 4B:
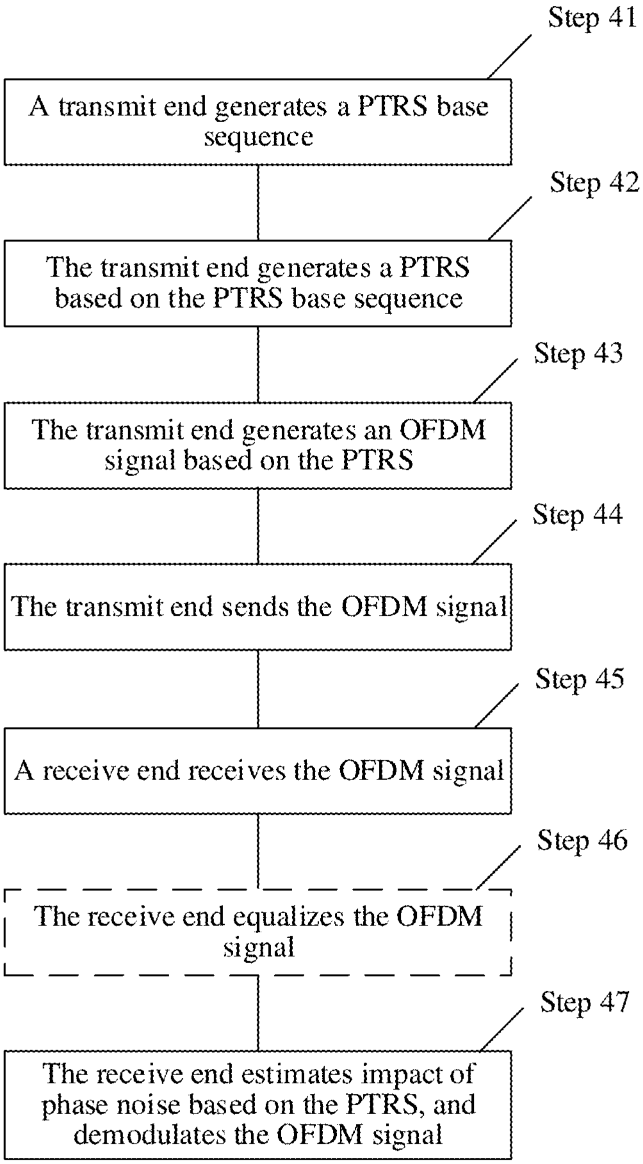
FIG. 4*b* is a schematic diagram of a process of a signal transmission method according to at least one embodiment.

As shown in FIG. 4*b*, an example of transmitting an OFDM signal is described by using an OFDM system and a reference signal that is a PTRS. A transmit end described below is the first device in FIG. 4*a*. The following steps are included.

Step 41: The transmit end generates a PTRS base sequence.

Step 42: The transmit end generates a PTRS based on the PTRS base sequence.

For example, for step 41 and step 42, refer to the foregoing descriptions in step 402*a*.

For example, a process of step 41 includes: A first sequence is sequentially mapped to base sequences in M reference signals, and signals mapped to the base sequences in the M reference signals are consecutive in the first sequence.

The first sequence with a length of N is divided into M subsequences, a length of an $m^{th}$ subsequence is $L_m$, the M subsequences are respectively mapped to the base sequences in the M reference signals, and the $m^{th}$ subsequence is mapped to a base sequence in an $m^{th}$ reference signal.

In response to the first sequence being sequentially mapped to the base sequences in the M reference signals, for example, the first sequence is mapped to the base sequences in the M (consecutive) reference signals in ascending order of location indexes in the base sequences and ascending order of signal indexes in the first sequence; or the first sequence is mapped to the base sequences in the M (consecutive) reference signals in ascending order of location indexes in the base sequences and descending order of signal indexes in the first sequence.

For example, a process of step 42 includes: Signals in the first sequence are mapped to cyclic redundancy sequences 1 and cyclic redundancy sequences 2 in the M reference signals in a manner in which signals mapped to each reference signal are cyclically consecutive.

For any reference signal, a signal mapped to a first location in a base sequence is a $z^{th}$ signal (which is referred to as a signal $S_1$) in the first sequence, and a signal mapped to a last location in the base sequence is an $x^{th}$ signal (which is referred to as a signal $S_L$) in the first sequence.

In an example, in response to the first sequence being mapped to the base sequences in the M (consecutive) reference signals in ascending order of location indexes in the base sequences and ascending order of signal indexes in the first sequence, z is less than x.

For the any reference signal, a signal mapped to a $j^{th}$ location before the first location in the base sequence (which is alternatively understood as a $j^{th}$ signal before the signal $S_1$ after mapping) is a $(z-j)^{th}$ signal in the first sequence, and in response to z−j being less than or equal to 0, z−j is replaced with z−j+N; and a signal mapped to a $j^{th}$ location after the last location in the base sequence (which is alternatively understood as a $j^{th}$ signal after the signal S L after mapping) is an $(x+j)^{th}$ signal in the first sequence, and in response to x+j being greater than N, x+j is replaced with x+j−N.

In another example, in response to the first sequence being mapped to the base sequences in the M (consecutive) reference signals in ascending order of location indexes in the base sequences and descending order of signal indexes in the first sequence, z is greater than x.

For the any reference signal, a signal mapped to a $j^{th}$ location before the first location in the base sequence (which is alternatively understood as a $j^{th}$ signal before the signal $S_1$ after mapping) is a $(z+j)^{th}$ signal in the first sequence, and in response to z+j being greater than N, z+j is replaced with z+j−N; and a signal mapped to a $j^{th}$ location after the last location in the base sequence (which is alternatively understood as a $j^{th}$ signal after the signal $S_L$ after mapping) is an $(x-j)^{th}$ signal in the first sequence, and in response to z−j being less than or equal to 0, x−j is replaced with x−j+N.

Step 43: The transmit end generates an OFDM signal based on the PTRS.

For example, the PTRS is placed on a corresponding OFDM subcarrier. For example, the PTRS and data are combined to generate an OFDM signal.

Step 44: The transmit end sends the OFDM signal.

Step 45: A receive end receives the OFDM signal.

Step 46: The receive end equalizes the OFDM signal, that is, eliminates impact of a channel. This step is an optional step.

Step 47: The receive end estimates impact of phase noise based on the PTRS, and demodulates the OFDM signal.

For example, an ICI coefficient caused by the phase noise is estimated by using the PTRS, to obtain, through demodulation, data transmitted by using the OFDM signal.

The receive end determines information about a reference signal (for example, a PTRS), including but not limited to a subcarrier location, a quantity of subcarriers, and the sent reference signal (for example, the PTRS). In this way, the receive end estimates, based on the PTRS, the impact caused by the phase noise. The transmit end is a terminal device, and the receive end is a network device; or the transmit end is a network device, and the receive end is a terminal device. Information about the PTRS is configured by the network device for the terminal device, for example, configured by using downlink control information (downlink control information, DCI), media access control (media access control, MAC) signaling, or radio resource control (radio resource control, RRC) signaling.

Figure 7:
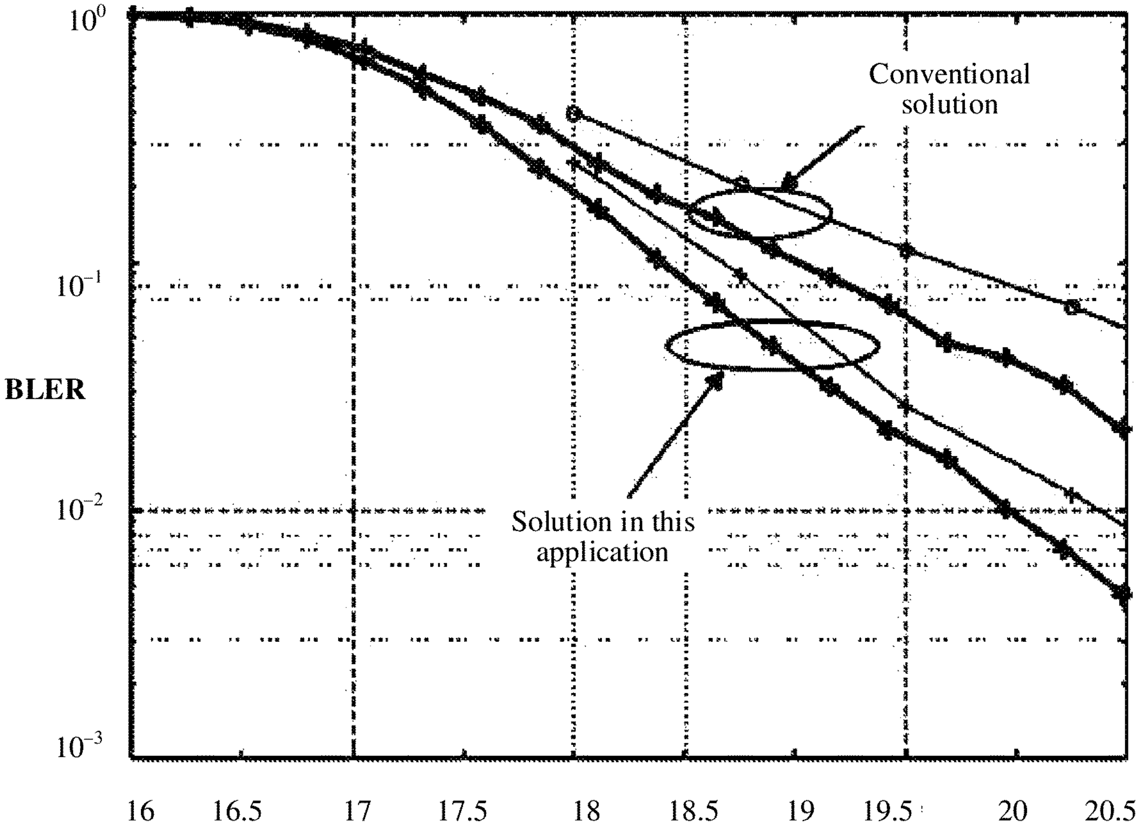
FIG. 7 is a schematic diagram of data demodulation performance according to at least one embodiment.

As shown in FIG. 7, a schematic diagram of comparison of data demodulation performance is provided. A ZC sequence is used as the first sequence, a thick line represents a demodulation solution with high complexity, and a thin line represents a demodulation solution with low complexity. Regardless of in the demodulation solution with high complexity or the demodulation solution with low complexity, performance of at least one embodiment is better than that of the conventional technology (a conventional block solution).

The foregoing describes the method in at least one embodiment. The following describes an apparatus in at least one embodiment. The method and the apparatus are based on a same technical idea. The method and the apparatus have similar principles for resolving problems. Therefore, for implementations of the apparatus and the method, mutual reference is made. Repeated parts are not described.

In at least one embodiment, the apparatus is divided into functional modules based on the foregoing method examples. For example, each functional module is obtained through division based on each corresponding function, or two or more functions is integrated into one module. These modules is implemented in a form of hardware, or is implemented in a form of a software functional module. In at least one embodiment, division into the modules is an example, and is merely logical function division. In specific implementation, another division manner is used.

Figure 8:
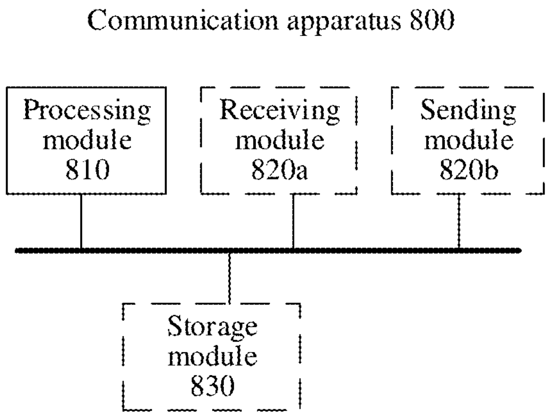
FIG. 8 is a schematic diagram of a structure of a communication apparatus according to at least one embodiment.

Based on a same technical idea as the foregoing method, FIG. 8 provides a schematic diagram of a structure of a communication apparatus 800. The apparatus 800 includes a processing module 810, and optionally, further includes a receiving module 820*a*, a sending module 820*b*, and a storage module 830. The processing module 810 is separately connected to the storage module 830, the receiving module 820*a*, and the sending module 820*b*. The storage module 830 is also connected to the receiving module 820*a* and the sending module 820*b*.

In an example, the receiving module 820*a* and the sending module 820*b* is integrated together, and are defined as a transceiver module.

In an example, the apparatus 800 is a first device, or is a chip or a functional unit used in a first device. The apparatus 800 has any function of the first device in the foregoing method. For example, the apparatus 800 performs the steps performed by the first device in the methods in FIG. 4*a* and FIG. 4*b*.

The receiving module 820*a* performs a receiving action performed by the first device in the foregoing method embodiment. The sending module 820*b* performs a sending action performed by the first device in the foregoing method embodiment.

The processing module 810 performs an action other than the sending action and the receiving action in actions performed by the first device in the foregoing method embodiment. In an example, the processing module 810 is configured to map a first sequence to M subcarrier blocks used to transmit a reference signal, where an $m^{th}$ subcarrier block includes $Q_m$ subcarriers, $Q_m$ is an integer greater than or equal to 2, m is all of integers from 1 to M, M is an integer greater than or equal to 2, the first sequence includes a plurality of signals, a plurality of signals mapped to a plurality of consecutive subcarriers at a rear location in the $m^{th}$ subcarrier block are the same as a plurality of signals mapped to a plurality of consecutive subcarriers at a front location in a $(\text{mod}(m, M)+1)^{th}$ subcarrier block, and mod(m, M) is a remainder obtained by dividing m by M.

The sending module 820*b* is configured to send a mapped signal on each subcarrier.

In an example, the processing module 810 is specifically configured to: map, in ascending order of subcarrier indexes and ascending order of signal indexes, the first sequence to the M subcarrier blocks used to transmit a reference signal; or map, in ascending order of subcarrier indexes and descending order of signal indexes, the first sequence to the M subcarrier blocks used to transmit a reference signal.

In an example, the receiving module 820*a* is configured to receive a first sequence sent by another device.

In an example, the storage module 830 stores computer-executable instructions of the method performed by the first device, so that the processing module 810, the receiving module 820*a*, and the sending module 820*b* perform the method performed by the first device in the foregoing example.

For example, the storage module 830 includes one or more memories. The memory is a component that is configured to store a program or data and that is in one or more devices or circuits. The storage module is a register, a cache, a RAM, or the like. The storage module is integrated with the processing module. The storage module is a ROM or another type of static storage device that stores static information and instructions. The storage module is independent of the processing module.

The receiving module 820*a* and the sending module 820*b* is an input or output interface, a pin, a circuit, or the like.

The processing module 810 in FIG. 8 is implemented by using a processing circuit. The receiving module 820*a* and the sending module 820*b* in FIG. 8 is implemented by using an input/output interface. Alternatively, the input/output interface includes an input interface and an output interface. The input interface performs functions of the receiving module, and the output interface performs functions of the sending module. The storage module 830 in FIG. 8 is implemented by using a storage medium.

The foregoing describes the apparatus used in the first device in at least one embodiment. The following describes a possible product form of the apparatus used in the first device. Any form of product that has a feature of the apparatus used in the first device in FIG. 8 falls within the protection scope of at least one embodiment. The following descriptions are merely an example, and should not constitute a limitation indicating that the product form of the apparatus used in the first device in at least one embodiment is limited to this.

Figure 9:
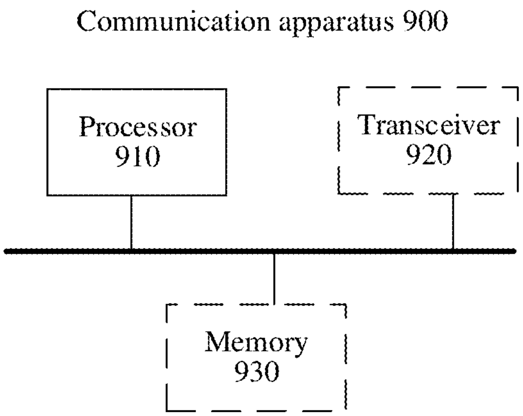
FIG. 9 is a schematic diagram of a structure of a communication apparatus according to at least one embodiment.

As a possible product form, the apparatus is implemented by using a general bus architecture. As shown in FIG. 9, a schematic block diagram of a communication apparatus 900 is provided. The apparatus 900 includes a processor 910, and optionally, further includes a transceiver 920 and a memory 930. The transceiver 920 is configured to: receive a program or instructions, and transmit the program or the instructions to the processor 910. Alternatively, the transceiver 920 is configured to implement communication and interaction between the apparatus 900 and another communication device, for example, exchange control signaling and/or service data. The transceiver 920 is a code and/or data read/write transceiver, or the transceiver 920 is a signal transmission transceiver between the processor 910 and the transceiver 920. The processor 910 and the memory 930 are electrically coupled.

In an example, the apparatus 900 is a first device, or is a chip used in a first device. It should be understood that the apparatus has any function of the first device in the foregoing method. For example, the apparatus 900 performs the steps performed by the first device in the methods in FIG. 4*a* and FIG. 4*b*. For example, the memory 930 is configured to store a computer program. The processor 910 is configured to invoke the computer program or instructions stored in the memory 930, to perform the method performed by the first device in the foregoing example, or perform, through the transceiver 920, the method performed by the first device in the foregoing example.

As a possible product form, the apparatus is implemented by using a general-purpose processor (the general-purpose processor is also referred to as a chip or a chip system). In a possible implementation, the general-purpose processor that implements the apparatus used in the first device includes a processing circuit (the processing circuit is also referred to as a processor). Optionally, the apparatus 900 further includes an input/output interface and a storage medium (the storage medium is also referred to as a memory) that are internally connected to and communicate with the processing circuit. The storage medium is configured to store instructions executable by the processing circuit, to perform the method performed by the first device in the foregoing example.

As a possible product form, the apparatus in at least one embodiment is alternatively implemented by using the following: one or more FPGAs (field programmable gate arrays), a PLD (programmable logic device), a controller, a state machine, gate logic, a discrete hardware component, any other proper circuit, or any combination of circuits that performs various functions described in at least one embodiment.

At least one embodiment further provides a computer-readable storage medium, storing a computer program. In response to the computer program being executed by a computer, the computer is enabled to perform the signal sending method. Alternatively, the computer program includes instructions used to implement the signal sending method.

At least one embodiment further provides a computer program product, including computer program code. In response to the computer program code being run on a computer, the computer is enabled to perform the signal sending method.

In addition, the processor in at least one embodiment is a central processing unit (central processing unit, CPU) or a baseband processor, where the baseband processor and the CPU is integrated or separated, or is a network processor (network processor, NP) or a combination of a CPU and an NP. The processor further includes a hardware chip or another general-purpose processor. The hardware chip is an application-specific integrated circuit (application-specific integrated circuit, ASIC), a programmable logic device (programmable logic device, PLD), or a combination thereof. The PLD is a complex programmable logic device (complex programmable logic device, CPLD), a field programmable gate array (field programmable gate array, FPGA), generic array logic (generic array logic, GAL) and another programmable logic device, a discrete gate or a transistor logic device, a discrete hardware component, or any combination thereof. The general-purpose processor is a microprocessor, or the processor is any conventional processor or the like.

The memory in at least one embodiment is a volatile memory or a nonvolatile memory, or includes both a volatile memory and a non-volatile memory. The nonvolatile memory is a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory is a random access memory (Random Access Memory, RAM), and is used as an external cache. Based on descriptions used as an example instead of a limitation, many forms of RAMs is used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). The memory described in at least one embodiment includes but is not limited to these memories and any memory of another proper type.

The transceiver in at least one embodiment includes a separate transmitter and/or a separate receiver, or the transmitter and the receiver is integrated. The transceiver works based on an indication of a corresponding processor. Optionally, the transmitter corresponds to a transmitter machine in a physical device, and the receiver corresponds to a receiver machine in the physical device.

Persons of ordinary skill in the art is aware that the method steps and units described with reference to embodiments disclosed in at least one embodiment is implemented by electronic hardware, computer software, or a combination thereof. To clearly describe interchangeability between the hardware and the software, the foregoing generally describes steps and compositions of each embodiment based on functions. Whether the functions are performed by hardware or software depends on particular applications and design constraint conditions of the technical solutions. Persons of ordinary skill in the art are able to use different methods to implement the described functions for each particular application, but the implementation does not go beyond the scope of embodiments described herein.

In at least one embodiment, the disclosed system, apparatus, and method is implemented in other manners. For example, the described apparatus embodiment is merely an example. For example, division into the units is merely logical function division and is other division in actual implementation. For example, a plurality of units or components is combined or integrated into another system, or some features is ignored or not performed. In addition, the displayed or discussed mutual couplings or direct couplings or communication connections is implemented through some interfaces, indirect couplings or communication connections between the apparatuses or units, or electrical connections, mechanical connections, or connections in other forms.

The units described as separate parts may or may not be physically separate, and parts displayed as units may or may not be physical units, is located at one location, or is distributed on a plurality of network units. Some or all of the units is selected based on actual use to achieve the objectives of the solutions of at least one embodiment.

In addition, functional units in at least one embodiment is integrated into one processing unit, each of the units exists alone physically, or two or more units are integrated into one unit. The integrated unit is implemented in a form of hardware, or is implemented in a form of a software functional unit.

In response to the integrated unit being implemented in the form of a software functional unit and sold or used as an independent product, the integrated unit is stored in a computer-readable storage medium. Based on such an understanding, the technical solutions in at least one embodiment essentially, or the part contributing to the conventional technology, or all or some of the technical solutions is implemented in a form of a software product. The computer software product is stored in a storage medium and includes several instructions for instructing a computer device (which is a personal computer, a server, a network device, or the like) to perform all or some of the steps of the methods described in at least one embodiment. The storage medium includes any medium that stores program code, for example, a USB flash drive, a removable hard disk drive, a read-only memory (read-only memory, ROM), a random access memory (random access memory, RAM), a magnetic disk, or an optical disc.

The term "and/or" in at least one embodiment describes an association relationship between associated objects and represents that three relationships exists. For example, A and/or B represent the following three cases: Only A exists, both A and B exist, and only B exists. The character "/" usually indicates an "or" relationship between associated objects. "A plurality of" in at least one embodiment means two or more. In addition, in the descriptions of at least one embodiment, terms such as "first" and "second" are merely used for distinguishing and description, but should not be understood as an indication or implication of relative importance, or should not be understood as an indication or implication of a sequence.

Although some preferred embodiments are described, persons skilled in the art is able to make changes and modifications to these embodiments once they learn of the basic inventive concept. Therefore, the appended claims are intended to be construed as to cover the preferred embodiments and all changes and modifications falling within the scope of at least one embodiment.

Clearly, persons skilled in the art are able to make various modifications and variations to at least one embodiment without departing from the spirit and scope of at least one embodiment. In this way, at least one embodiment is intended to cover these modifications and variations to at least one embodiment provided that they fall within the scope of protection defined by the following claims and their equivalent technologies of at least one embodiment.

What is claimed is:

1. A communication method, comprising:

mapping a first sequence to M subcarrier blocks used to transmit a reference signal, wherein an $m^{th}$ subcarrier block includes $Q_m$ subcarriers, $Q_m$ is an integer greater than or equal to 2, m is all of integers from 1 to M, Mis an integer greater than or equal to 2, the first sequence includes a first plurality of signals, a second plurality of signals mapped to a second plurality of consecutive subcarriers at a rear location in the $m^{th}$ subcarrier block are same as the first plurality of signals mapped to a first plurality of consecutive subcarriers at a front location in a $(\mathrm{mod}(m, M)+1)^{th}$ subcarrier block, and mod(m, M) is a remainder obtained by dividing m by M; and sending the reference signal comprising at least one of the mapped first plurality of signals or the mapped second plurality of signals on each of corresponding M subcarrier blocks.

2. The method according to claim 1, wherein the mapping the first sequence to the M subcarrier blocks used to transmit the reference signal includes:

mapping, in ascending order of subcarrier indexes and ascending order of signal indexes, the first sequence to the M subcarrier blocks used to transmit the reference signal; or mapping, in ascending order of the subcarrier indexes and descending order of the signal indexes, the first sequence to the M subcarrier blocks used to transmit the reference signal.

3. The method according to claim 1, wherein the $m^{th}$ subcarrier block includes a first subcarrier with a length of $p\mathbf{1}_m$, a second subcarrier with a length of $L_m$, and a third subcarrier with a length of $p\mathbf{2}_m$ that are sequentially arranged; and signals mapped to second subcarriers in the M subcarrier blocks are consecutive in the first sequence.

4. The method according to claim 3, wherein a sum of lengths of the second subcarriers respectively included in the M subcarrier blocks is a length of the first sequence.

5. The method according to claim 3, wherein $L_m$ meets the following formula: $L_m$=N/M, $L_m$=floor(N/M), $L_m$=floor(N/M)+1, $L_m$=ceil(N/M), or $L_m$=ceil(N/M)−1, wherein floor is rounding down, ceil is rounding up, N is the length of the first sequence, and a value of m is some or all of the integers from 1 to M.

6. The method according to claim 3, wherein a difference between $p\mathbf{1}_m$ and $p\mathbf{2}_m$ is less than or equal to 1, and a value of m is some or all of the integers from 1 to M.

7. The method according to claim 4, wherein a value of $Q_m$ is determined based on a value of $p\mathbf{1}_m$ and/or a value of $p\mathbf{2}_m$.

8. The method according to claim 4, wherein values of $p\mathbf{1}_m$ and $p\mathbf{2}_m$ are associated with at least one of $Q_m$, M, and N, and a value of m is some or all of the integers from 1 to M.

9. The method according to claim 1, wherein $Q_m$=a*q, wherein q is a quantity of subcarriers in one resource block RB, a is an integer greater than or equal to 1, and a value of m is some or all of the integers from 1 to M.

10. The method according to claim 1, wherein the first sequence is any one of the following sequences:
a ZC sequence, a quadrature amplitude modulation QAM sequence, a complementary sequence, and a pseudo-random sequence.

11. A communication apparatus, comprising:
a memory storing computer programs or instructions; and
a processor connected to the memory, wherein the processor is configured to execute some or all of the computer programs or instructions in the memory to perform operations to:
map a first sequence to M subcarrier blocks used to transmit a reference signal, wherein an $m^{th}$ subcarrier block includes $Q_m$ subcarriers, $Q_m$ is an integer greater than or equal to 2, m is all of integers from 1 to M, M is an integer greater than or equal to 2, the first sequence includes a first plurality of signals, a second plurality of signals mapped to a second plurality of consecutive subcarriers at a rear location in the $m^{th}$ subcarrier block are same as the first plurality of signals mapped to a first plurality of consecutive subcarriers at a front location in a $(mod(m, M)+1)^{th}$ subcarrier block, and mod(m, M) is a remainder obtained by dividing m by M; and
send the reference signal comprising at least one of the mapped first plurality of signals or the mapped second plurality of signals on each of corresponding M subcarrier blocks.

12. A non-transitory computer-readable storage medium, computer-readable instructions stored thereon, which when executed by a processor causes the processor to perform operations comprising:
mapping a first sequence to M subcarrier blocks used to transmit a reference signal, wherein an $m^{th}$ subcarrier block includes $Q_m$ subcarriers, $Q_m$ is an integer greater than or equal to 2, m is all of integers from 1 to M, M is an integer greater than or equal to 2, the first sequence includes a first plurality of signals, a second plurality of signals mapped to a second plurality of consecutive subcarriers at a rear location in the $m^{th}$ subcarrier block are same as the first plurality of signals mapped to a first plurality of consecutive subcarriers at a front location in a $(mod(m, M)+1)^{th}$ subcarrier block, and mod(m, M) is a remainder obtained by dividing m by M; and
sending the reference signal comprising at least one of the mapped first plurality of signals or the mapped second plurality of signals on each of corresponding M subcarrier blocks.

13. The communication apparatus according to claim 11, wherein the mapping the first sequence to the M subcarrier blocks used to transmit the reference signal includes:
mapping, in ascending order of subcarrier indexes and ascending order of signal indexes, the first sequence to the M subcarrier blocks used to transmit the reference signal; or
mapping, in ascending order of the subcarrier indexes and descending order of the signal indexes, the first sequence to the M subcarrier blocks used to transmit the reference signal;
wherein the first sequence is any one of a ZC sequence, a quadrature amplitude modulation QAM sequence, a complementary sequence, and a pseudo-random sequence.

14. The communication apparatus according to claim 11, wherein the $m^{th}$ subcarrier block includes a first subcarrier with a length of $p1_m$, a second subcarrier with a length of $L_m$, and a third subcarrier with a length of $p2_m$ that are sequentially arranged; and
signals mapped to second subcarriers in the M subcarrier blocks are consecutive in the first sequence.

15. The communication apparatus according to claim 14, wherein a sum of lengths of the second subcarriers respectively included in the M subcarrier blocks is a length of the first sequence, wherein $L_m$ meets the following formula: $L_m$=N/M, $L_m$=floor(N/M), $L_m$=floor(N/M)+1, $L_m$=ceil(N/M), or $L_m$=ceil(N/M)−1, wherein floor is rounding down, ceil is rounding up, N is the length of the first sequence, and a value of m is some or all of the integers from 1 to M, and wherein a difference between $p1_m$ and $p2_m$ is less than or equal to 1, and the value of m is some or all of the integers from 1 to M.

16. The communication apparatus according to claim 15, wherein a value of $Q_m$ is determined based on a value of $p1_m$ and/or a value of $p2_m$, wherein values of $p1_m$ and $p2_m$ are associated with at least one of $Q_m$, M, and N, and the value of m is some or all of the integers from 1 to M, and wherein $Q_m$=a*q, wherein q is a quantity of subcarriers in one resource block RB, a is an integer greater than or equal to 1, and the value of m is some or all of the integers from 1 to M.

17. The non-transitory computer-readable storage medium according to claim 12, wherein the mapping the first sequence to the M subcarrier blocks used to transmit the reference signal includes:
mapping, in ascending order of subcarrier indexes and ascending order of signal indexes, the first sequence to the M subcarrier blocks used to transmit the reference signal; or
mapping, in ascending order of subcarrier indexes and descending order of signal indexes, the first sequence to the M subcarrier blocks used to transmit the reference signal;
wherein the first sequence is any one of a ZC sequence, a quadrature amplitude modulation QAM sequence, a complementary sequence, and a pseudo-random sequence.

18. The non-transitory computer-readable storage medium according to claim 12, wherein the $m^{th}$ subcarrier block includes a first subcarrier with a length of $p1_m$, a second subcarrier with a length of $L_m$, and a third subcarrier with a length of $p2_m$ that are sequentially arranged; and
signals mapped to second subcarriers in the M subcarrier blocks are consecutive in the first sequence.

19. The non-transitory computer-readable storage medium according to claim 18, wherein a sum of lengths of the second subcarriers respectively included in the M subcarrier blocks is a length of the first sequence, wherein $L_m$ meets the following formula: $L_m$=N/M, $L_m$=floor(N/M), $L_m$=floor(N/M)+1, $L_m$=ceil(N/M), or $L_m$=ceil(N/M)−1, wherein floor is rounding down, ceil is rounding up, N is the length of the first sequence, and a value of m is some or all of the integers from 1 to M, and wherein a difference between $p1_m$ and $p2_m$ is less than or equal to 1, and the value of m is some or all of the integers from 1 to M.

20. The non-transitory computer-readable storage medium according to claim 19, wherein a value of $Q_m$ is determined based on a value of $p1_m$ and/or a value of $p2_m$, wherein values of $p1_m$ and $p2_m$ are associated with at least one of $Q_m$, M, and N, and the value of m is some or all of the integers from 1 to M, and wherein $Q_m$=a*q, wherein q is a quantity of subcarriers in one resource block RB, a is an integer greater than or equal to 1, and the value of m is some or all of the integers from 1 to M.

* * * * *